US012463981B1

(12) United States Patent
Ismirnioglou

(10) Patent No.: US 12,463,981 B1
(45) Date of Patent: Nov. 4, 2025

(54) SYSTEMS AND METHODS FOR COUNTER-RECONNAISSANCE IN CLOUD INFRASTRUCTURE TO DISRUPT ADVERSARIAL TARGETING

(71) Applicant: FRENETIK LLC, Baltimore, MD (US)

(72) Inventor: Hans Ismirnioglou, Bethesda, MD (US)

(73) Assignee: FRENETIK LLC, Baltimore, MD (US)

( * ) Notice: Subject to any disclaimer, the term of this patent is extended or adjusted under 35 U.S.C. 154(b) by 0 days.

(21) Appl. No.: 19/236,472

(22) Filed: Jun. 12, 2025

Related U.S. Application Data

(60) Provisional application No. 63/729,921, filed on Dec. 9, 2024.

(51) Int. Cl.
*H04L 9/40* (2022.01)

(52) U.S. Cl.
CPC .......... *H04L 63/108* (2013.01); *H04L 63/083* (2013.01); *H04L 63/1416* (2013.01)

(58) Field of Classification Search
CPC .. H04L 63/108; H04L 63/083; H04L 63/1416
USPC .......................................................... 726/1
See application file for complete search history.

(56) References Cited

U.S. PATENT DOCUMENTS

| | | | | |
|---|---|---|---|---|
| 6,363,488 | B1* | 3/2002 | Ginter | H04N 21/44204 375/E7.009 |
| 9,824,196 | B2* | 11/2017 | Moloian | H04L 63/102 |
| 10,855,674 | B1* | 12/2020 | Geusz | H04L 63/20 |
| 11,025,638 | B2* | 6/2021 | Ford | H04L 63/107 |
| 2015/0334102 | A1* | 11/2015 | Haugsnes | G06F 16/955 726/1 |
| 2016/0357955 | A1* | 12/2016 | Kruse | G06F 21/31 |
| 2017/0041343 | A1* | 2/2017 | Wong | H04L 63/20 |
| 2020/0204558 | A1* | 6/2020 | Kurmi | H04L 63/101 |
| 2020/0285737 | A1* | 9/2020 | Kraus | G06F 21/552 |
| 2022/0020023 | A1* | 1/2022 | Ju | G06Q 20/227 |

(Continued)

OTHER PUBLICATIONS

International Search Report and Written Opinion by ISA/US of PCT/US25/33373 dated Aug. 8, 2025.

*Primary Examiner* — Badrinarayanan

(74) *Attorney, Agent, or Firm* — Outlier Patent Attorneys, PLLC

(57) ABSTRACT

The present invention relates to a cybersecurity system for preventing adversarial reconnaissance in cloud, hybrid, and multi-cloud environments by dynamically modifying user authentication identifiers, hostnames and fully qualified domain names. The system updates login usernames in real time using randomized, non-repeating values generated from a configurable dictionary. Updates occur at scheduled, random, coordinated, or event-triggered intervals to disrupt profiling and targeting attempts. When identifiers are changed, associated sessions and tokens are invalidated to prevent reuse. The system monitors expired credential usage to detect potential reconnaissance, generating alerts with intelligence such as IP addresses, timestamps, and affected resources. By eliminating predictable identity patterns, the system defends against reconnaissance-based attacks, unauthorized access attempts, and other credential-driven threats, thereby improving organizational security across cloud platforms.

19 Claims, 8 Drawing Sheets

(56) References Cited

U.S. PATENT DOCUMENTS

2024/0056486 A1\* 2/2024 Lowenhardt ............ H04L 41/16
2024/0129323 A1\* 4/2024 Garyani ................ G06F 21/554

\* cited by examiner

SYSTEMS AND METHODS FOR COUNTER-RECONNAISSANCE IN CLOUD INFRASTRUCTURE TO DISRUPT ADVERSARIAL TARGETING

CROSS-REFERENCE TO RELATED APPLICATIONS

This Application claims priority to U.S. Provisional Patent Application No. 63/729,921 filed on Dec. 9, 2024, entitled "SYSTEMS AND METHODS FOR COUNTER-RECONNAISSANCE IN CLOUD INFRASTRUCTURE TO DISRUPT ADVERSARIAL TARGETING", the contents of which are incorporated herein by reference.

BACKGROUND

Field of the Art

This invention pertains to the field of cybersecurity, with a focus on the dynamic and automated modification of human user identities within cloud-based, hybrid, and multi-cloud environments.

Discussion of the State of the Art

The challenge of targeted reconnaissance by adversaries remains a critical vulnerability in cybersecurity. Attackers exploit predictable patterns in identity naming conventions, particularly static usernames, email addresses, host names and Fully Qualified Domain Names (FQDN), to systematically gather intelligence about potential targets. These static identifiers, which are often used interchangeably for both communication (e.g. email correspondence) and authentication (e.g. login credentials), present a critical issue. This dual-purpose usage means that identifiers like email addresses are frequently exposed through routine communications and are also relied upon for sensitive access control, creating a readily available and easily exploitable attack vector.

Furthermore, organizations often use email addresses or usernames for both communication and authentication over extended periods of time. This creates a static identity landscape that attackers can easily analyze and exploit. Over time, adversaries can identify valid usernames, email addresses, host names and FQDN, increasing the success rate of their attacks. The problem is further amplified by the practice of using email addresses as both the primary communication handle and the login identifier.

These static identifiers are also collected and distributed by nation-states, cybercriminal groups, and dark web marketplaces. Nation-states often identify high-value targets for advanced persistent threat attacks. Cybercriminals harvest large repositories of usernames, email addresses, host names and FQDN, which are then used in phishing campaigns, credential-stuffing attacks, and brute force attempts. These identifiers also appear in databases of leaked or stolen credentials, which are sold or traded on dark web forums.

Numerous strategies have been employed to mitigate these risks, but they exhibit significant limitations. Organizations often enforce complex password policies, frequent password changes, or secret rotation to reduce the success of credential-based attacks. While these measures strengthen authentication, they do not address the vulnerability of static usernames, email addresses, host names and FQDN, which remain exposed over their prolonged use and dual-purpose roles. Similarly, multi-factor authentication (MFA) provides an additional layer of security but fails to resolve the predictability of long-term static identities, allowing attackers to continue reconnaissance activities with minimal impediment.

Role-based access control (RBAC) is another widely used approach to limit access based on user roles and permissions. However, RBAC does not inherently protect against the reconnaissance of user identities. Attackers can still gather information about valid accounts and their associated roles by exploiting the static nature of usernames, email addresses, host names and FQDN. Deception techniques, such as honeypots or fake resources, aim to mislead attackers by diverting them toward unused or falsified assets. However, these techniques are contingent upon adversaries engaging with deceptive elements, and skilled attackers can often detect and bypass such traps. Consequently, deception methods are not reliable for addressing the foundational issue of static identity naming conventions.

Security awareness programs are another approach for reducing vulnerabilities. These programs are generally designed to educate users on avoiding phishing and social engineering attacks. While these initiatives can improve user behavior, they rely heavily on user vigilance and cannot mitigate the weaknesses of static identity identifiers. Such programs fail to address the systemic nature of the problem.

Ultimately, existing solutions provide incremental improvements, but do not effectively eliminate the vulnerabilities arising from static user identities. The prolonged use of static usernames, email addresses, host names and FQDN, combined with their dual-purpose roles for communication and authentication, remains a common theme compounding the issue. The collection and dissemination of these identifiers by various actors further exacerbate the threat landscape.

SUMMARY

The invention pertains to the field of cybersecurity, specifically focusing on the dynamic and automated management of human user identities within cloud-based, hybrid, and/or multi-cloud environments. The system aims to enhance cybersecurity by disrupting adversarial reconnaissance efforts and reducing the effectiveness of targeted attacks on user accounts. It introduces a system for real-time modification and obfuscation of user identifiers, including login usernames for authentication and other principal identifiers tied to individuals. The steps that are disclosed by the present invention may be applied to host names and FQDN in addition to usernames. The system is particularly well-suited for high-value targets, such as privileged users or high-profile individuals who face elevated risks of reconnaissance and targeted attacks. By employing randomized, scheduled, coordinated, and/or trigger-based updates, the invention disrupts adversarial reconnaissance efforts and reduces the efficacy of targeting user accounts for compromise and exploitation. The system enhances security by reducing and potentially eliminating predictable identity patterns, safeguarding against reconnaissance-based attacks, unauthorized access attempts, and other advanced threats.

In addition to dynamically modifying user login credentials, the system also supports real-time updates to hostnames and fully qualified domain names (FQDNs) associated with cloud-hosted user accounts or remotely accessible endpoint devices. This capability addresses the static naming conventions often used in infrastructure identifiers, which can be leveraged by adversaries for reconnaissance. By periodically or randomly updating hostnames and FQDNs according to configurable patterns or organizational policies, the system obfuscates device identity and disrupts attempts to map networked assets. These updates may be coordinated with user identity changes or triggered independently in response to security events. The system ensures that DNS records and cloud directory services are updated in parallel to preserve connectivity and operational integrity while maintaining a moving target defense against reconnaissance-based targeting. Administrators may define rules for permissible hostname structures or use dynamic dictionaries to generate compliant yet unpredictable names, thereby extending the protection of dynamic identity concepts to the infrastructure level.

The invention introduces systems and methods to counter adversarial reconnaissance by dynamically modifying human user login authentication identifiers across cloud, hybrid, and/or multi-cloud infrastructures. The proposed system mitigates this risk by dynamically altering login usernames used for authentication across platforms such as Microsoft Entra (Azure AD), Amazon Web Services (AWS), and Google Cloud. While communication email addresses remain unchanged, static login identifiers are replaced with dynamic ones that rotate at user-defined, random, and/or trigger-based intervals. By decoupling email addresses or static username from authentication credentials, the system creates a "moving target" for adversaries.

The system introduces a novel form of counter-reconnaissance by invalidating expired sessions and tokens whenever usernames are updated, neutralizing the risk of stale credential reuse. Any attempts to utilize outdated usernames are actively tracked, flagged, and/or analyzed as potential reconnaissance or compromise attempts. Administrators are provided with actionable insights, enabling swift and informed responses. Furthermore, a "burn-after-use" feature ensures that usernames can be configured to expire after a single login or a predefined time frame after initial use.

To prevent predictability, the system generates unique, non-repeating usernames using an embedded digital dictionary, while supporting user-defined wordlists and user-defined structures for enhanced customization. Notifications for updated login credentials are securely delivered through dynamic methods such as SMS, Signal, iMessage, email, or smartphone apps like Microsoft Authenticator.

By decoupling communication email addresses from authentication login credentials and continuously altering authentication login usernames, the system reduces or potentially eliminates vulnerabilities associated with static identifiers. This approach hinders attackers' ability to target high-value human accounts and reduces the effectiveness of credential-based attacks.

The system's adaptability extends across platforms, allowing uniform or environment-specific customization. Monitoring and alerting capabilities provide real-time visibility into expired credential usage attempts, offering organizations actionable insights to detect and mitigate potential threats. By dynamically adapting to both routine and high-risk environments, the system creates a robust defense layer that evolves over time.

The invention accommodates diverse organizational needs through configurable rotation intervals, custom wordlists and structures, and compatibility with multiple environments. By creating a dynamic and ever-changing identity landscape, it protects user accounts while providing enhanced safeguards for privileged or high value target users. The system offers a solution for modem cloud environments, addressing the vulnerabilities of static human identity login methods. The dynamic nature of the invention provides the ability to keep adversaries guessing, stuck in a targeting loop of always-changing login usernames, while also automatically identifying and notifying the successful targeting of past used login usernames.

The invention involves real-time modification and obfuscation of user identifiers, such as login usernames used for authentication, hostnames, FQDN, and other principal identifiers associated with individuals. While applicable to all users, the system is particularly beneficial for high-value targets, including privileged users and high-profile individuals who face heightened risks of reconnaissance and targeted attacks.

The system employs various techniques to update user identifiers, including randomization, scheduling, coordination, and/or trigger-based updates. These updates can be responsive to specific security events or conditions, ensuring that the identifiers remain dynamic and unpredictable. By eliminating predictable identity patterns, the invention safeguards against reconnaissance-based attacks, unauthorized access attempts, and other advanced threats.

The dynamic nature of the user identifiers makes it challenging for adversaries to gather accurate information about specific users and their associated accounts. This disruption of reconnaissance efforts hinders the ability of attackers to target and exploit user accounts effectively.

The invention is designed to operate seamlessly within diverse computing environments, including cloud-based, hybrid, and multi-cloud infrastructures. It can be integrated with existing identity, identity provider, and/or access management systems, enabling organizations to enhance their cybersecurity posture without significant modifications to their underlying infrastructure.

The system provides a configurable and customizable approach to managing user identities. Organizations can define policies and/or rules governing the frequency, complexity, and triggers for identifier updates. This flexibility allows the invention to adapt to the specific security requirements and risk profiles of different organizations and user groups.

By implementing the present invention, organizations can significantly reduce the attack surface associated with user identities. The dynamic and unpredictable nature of the identifiers makes it more difficult for adversaries to conduct targeted attacks, such as spear-phishing, password guessing, or social engineering. This enhanced security posture helps protect sensitive data, intellectual property, and other valuable assets.

In summary, the present invention introduces a system for dynamically managing and obfuscating user identities in computing environments. By employing real-time modifications and updates to user identifiers, the invention disrupts adversarial reconnaissance efforts and reduces the effectiveness of targeted attacks. The system is particularly valuable for high-value targets and can be seamlessly integrated into diverse computing infrastructures. Through its configurable and customizable approach, the invention enables organizations to enhance their cybersecurity posture and protect against advanced threats targeting user accounts.

BRIEF DESCRIPTION OF THE DRAWINGS

The accompanying drawings illustrate several embodiments and, together with the description, serve to explain the principles of the invention according to the embodiments. It will be appreciated by one skilled in the art that the particular arrangements illustrated in the drawings are merely exemplary and are not to be considered as limiting of the scope of the invention or the claims herein in any way.

DETAILED DESCRIPTION

Figure 1:
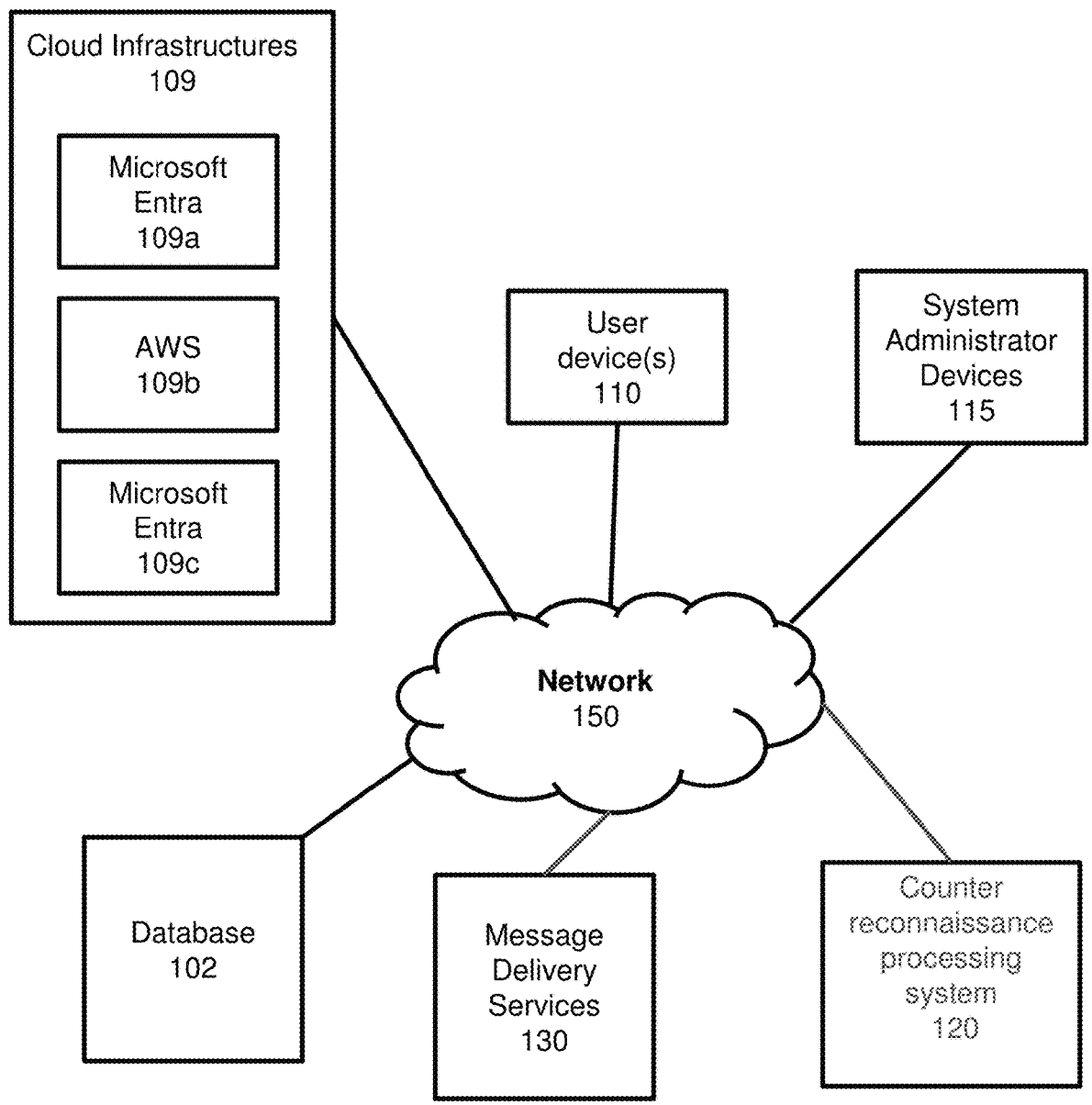
FIG. 1 illustrates a network architecture for systems and methods for counter-reconnaissance in cloud infrastructure to disrupt adversarial targeting in accordance with an exemplary embodiment of the invention.

One or more different embodiments may be described in the present application. Further, for one or more of the embodiments described herein, numerous alternative arrangements may be described; it should be appreciated that these are presented for illustrative purposes only and are not limiting of the embodiments contained herein or the claims presented herein in any way. One or more of the arrangements may be widely applicable to numerous embodiments, as may be readily apparent from the disclosure. In general, arrangements are described in sufficient detail to enable those skilled in the art to practice one or more of the embodiments, and it should be appreciated that other arrangements may be utilized and that structural, logical, software, electrical and other changes may be made without departing from the scope of the embodiments. Particular features of one or more of the embodiments described herein may be described with reference to one or more particular embodiments or figures that form a part of the present disclosure, and in which are shown, by way of illustration, specific arrangements of one or more of the aspects. It should be appreciated, however, that such features are not limited to usage in the one or more particular embodiments or figures with reference to which they are described. The present disclosure is neither a literal description of all arrangements of one or more of the embodiments nor a listing of features of one or more of the embodiments that must be present in all arrangements.

Headings of sections provided in this patent application and the title of this patent application are for convenience only and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible embodiments and in order to more fully illustrate one or more embodiments. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the embodiments, and does not imply that the illustrated process is preferred. Also, steps are generally described once per aspect, but this does not mean they must occur once, or that they may only occur once each time a process, method, or algorithm is carried out or executed. Some steps may be omitted in some embodiments or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various embodiments in which, for example, functions may be executed out of order from that shown or discussed, including substantially concurrently or in reverse order, depending on the functionality involved, as would be understood by those having ordinary skill in the art.

The detailed description set forth herein in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Network Architecture

FIG. 1 illustrates an exemplary embodiment of systems and methods for counter-reconnaissance in cloud infrastructure to disrupt adversarial targeting according to one embodiment. FIG. 1 illustrates an exemplary embodiment of a counter-reconnaissance in cloud infrastructure to disrupt adversarial targeting system according to one embodiment. The system includes system administrator devices 107 and user devices 110 connected to a counter-reconnaissance processing system 120 via a network 150. The processing system 120 is communicatively coupled with a database 102 for storing identity and access information and with one or more cloud infrastructures 109 where user identities and access credentials are managed. The architecture also includes message delivery services 130 configured to securely transmit updated access credentials or notifications to user devices through various channels (e.g., SMS, encrypted messaging, email). The system orchestrates dynamic identifier updates, monitors for threats, and delivers identity modifications across distributed environments in a coordinated manner. The various components described herein are exemplary and for illustration purposes only and any combination or subcombination of the various components may be used as would be apparent to one of ordinary skill in the art. The system may be reorganized or consolidated, as understood by a person of ordinary skill in the art, to perform the same tasks on one or more other servers or computing devices without departing from the scope of the invention. Although primarily described herein as pertaining to username modification, the same concepts may be used or adapted to modifying hostnames and/or FQDNs. In other words, any mention of usernames herein may be substituted with hostname and/or FQDN as would be apparent to one of ordinary skill in the art. Any absence of mention of hostnames or FQDN when discussing username modification is not an indication that the invention does not apply to hostnames and/or FQDN.

Database 102 may be configured to store and manage structured records of user data for use in tracking login activity and monitoring the usage of authentication credentials. It accomplishes this by maintaining a set of interrelated tables that log user identity information, dynamic username changes, invalid login attempts, and associated metadata such as timestamps, device identifiers, and access tokens. These tables enable the system to correlate credential usage with prior changes, identify suspicious reuse of outdated identifiers, and maintain a historical audit trail for administrative review and automated threat analysis. The database 102 is typically implemented as a relational database (e.g., SQLite or PostgreSQL), allowing for efficient indexing and querying of records across multiple attributes. As an alternative, the system may employ cloud-native or distributed database technologies such as AWS RDS, Google Firestore, or NoSQL databases like MongoDB to improve scalability, resilience, or support for unstructured data formats depending on deployment requirements.

The cloud infrastructures 109 represent the external cloud-based platforms where user identities, access credentials, and authentication processes are managed and enforced. These infrastructures serve as the operational environments in which dynamic identity modifications are applied, including updates to usernames, access tokens, and permissions. The system interfaces with these platforms—such as Microsoft Entra ID 109a, Amazon Web Services (AWS) 109b, and Google Cloud Platform (GCP) 109c—using secure APIs and platform-specific libraries to retrieve user data, apply changes to user principal names, and revoke or generate authentication tokens as needed. The cloud infrastructures 109 also serve as enforcement points for access control and threat detection in response to adversarial reconnaissance attempts. As an alternative, the system may be extended to support on-premises identity providers, hybrid environments, or additional cloud platforms such as Okta, Ping Identity, or private OpenID Connect-compliant directories.

User device(s) 110 include, generally, a computer or computing device including functionality for communicating (e.g., remotely) over a network 150. Data may be collected from user devices 110, and data requests may be initiated from each user device 110. User device(s) 110 may be a server, a desktop computer, a laptop computer, personal digital assistant (PDA), an in- or out-of-car navigation system, a smart phone or other cellular or mobile phone, or mobile gaming device, among other suitable computing devices. User devices 110 may execute one or more applications, such as a web browser (e.g., Microsoft Windows Internet Explorer, Mozilla Firefox, Apple Safari, Google Chrome, and Opera, etc.), or a dedicated application to submit user data, or to make prediction queries over a network 150.

In particular embodiments, each user device 110 may be an electronic device including hardware, software, or embedded logic components or a combination of two or more such components and capable of carrying out the appropriate functions implemented or supported by the user device 110. For example and without limitation, a user device 110 may be a desktop computer system, a notebook computer system, a netbook computer system, a handheld electronic device, or a mobile telephone. The present disclosure contemplates any user device 110. A user device 110 may enable a network user at the user device 110 to access network 150. A user device 110 may enable its user to communicate with other users at other user devices 110.

A user device 110 may have a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user device 110 may enable a user to enter a Uniform Resource Locator (URL) or other address directing the web browser to a server, and the web browser may generate a Hyper Text Transfer Protocol (HTTP) request and communicate the HTTP request to the server. The server may accept the HTTP request and communicate to the user device 110 one or more Hyper Text Markup Language (HTML) files responsive to the HTTP request. The user device 110 may render a web page based on the HTML files from the server for presentation to the user. The present disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

The user device 110 may also include an application that is loaded onto the user device 110. The application obtains data from the network 150 and displays it to the user within the application interface.

Exemplary user devices are illustrated in some of the subsequent figures provided herein. This disclosure contemplates any suitable number of user devices, including computing systems taking any suitable physical form. As example and not by way of limitation, computing systems may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, the computing system may include one or more computer systems; be unitary or distributed; span multiple locations; span multiple machines; or reside in a cloud, which may include one or more cloud components in one or more networks. Where appropriate, one or more computing systems may perform without substantial spatial or temporal limitation one or more steps of one or more methods described or illustrated herein. As an example, and not by way of limitation, one or more computing systems may perform in real time or in batch mode one or more steps of one or more methods described or illustrated herein. One or more computing systems may perform at different times or at different locations one or more steps of one or more methods described or illustrated herein, where appropriate.

The system administrator devices 115 are computing devices configured to provide administrative control and oversight of the counter-reconnaissance processing system. These devices enable administrators to configure identity modification schedules, define threat response policies, monitor login activity, and manage access credentials across multiple cloud environments. They accomplish this by interfacing with various backend modules—such as the user interface module, scheduling and notification module, and monitoring module—typically through a secure graphical interface or command-line tools. These devices may include desktop computers, laptops, or secure workstations equipped with authentication mechanisms like multi-factor authentication or hardware security modules. As an alternative, administrative access may be provided through mobile management consoles, virtual desktop infrastructure (VDI), or secure web portals to accommodate remote or distributed administration. The types of devices that may comprise the system administrator devices may include the same types of devices as the user devices 110.

The counter-reconnaissance processing system 120 is the central engine responsible for orchestrating dynamic identity modifications, tracking credential usage, and initiating automated responses to potential reconnaissance or unauthorized access attempts. It accomplishes this by coordinating the operation of various subsystems, including modules for authentication, dynamic modification, monitoring and alerting, invalidation, threat response, and scheduling. The processing system 120 receives input from system administrator devices and user devices, applies configured identity modification rules, updates access credentials across connected cloud infrastructures, and monitors for anomalies such as the use of expired usernames, hostnames, FQDN, or invalid tokens. It also logs activity to the database 102 and engages message delivery services to securely notify users of new credentials or detected threats. As an alternative, the counter-reconnaissance processing system 120 may be deployed as a distributed service architecture, a cloud-hosted orchestration platform, or integrated into an existing security information and event management (SIEM) system to support larger-scale or enterprise-grade environments.

The message delivery services 130 are responsible for securely transmitting updated credentials and identity-related notifications from the counter-reconnaissance processing system 120 to user devices 108. These services accomplish this by utilizing a variety of electronic and physical communication channels, including, but not limited to, SMS, encrypted messaging platforms (e.g., Signal, iMessage), email, enterprise mobile applications (e.g., Microsoft Authenticator), and voice-based communication methods such as phone calls. For high-security or offline environments, message delivery services 130 may also support physical methods such as printed credentials, hardware tokens, or verbal transmission in controlled settings. The system selects the delivery method based on user configuration, organizational policy, or environmental security constraints. As an alternative, message delivery services may be integrated with identity management tools, secure enclave systems, or enterprise-grade mobile device management (MDM) platforms to ensure consistent, auditable, and policy-compliant delivery of sensitive authentication information.

Network cloud 150 generally represents a network or collection of networks (such as the Internet or a corporate intranet, or a combination of both) over which the various components illustrated in FIG. 1 (including other components that may be necessary to execute the system described herein, as would be readily understood to a person of ordinary skill in the art). In particular embodiments, network 150 is an intranet, an extranet, a virtual private network (VPN), a local area network (LAN), a wireless LAN (WLAN), a wide area network (WAN), a metropolitan area network (MAN), a portion of the Internet, or another network 150 or a combination of two or more such networks 150. One or more links connect the systems and databases described herein to the network 150. In particular embodiments, one or more links each includes one or more wired, wireless, or optical links. In particular embodiments, one or more links each includes an intranet, an extranet, a VPN, a LAN, a WLAN, a WAN, a MAN, a portion of the Internet, or another link or a combination of two or more such links. The present disclosure contemplates any suitable network 150, and any suitable link for connecting the various systems and databases described herein.

The network 150 connects the various systems and computing devices described or referenced herein. In particular embodiments, network 150 is an intranet, an extranet, a virtual private network (VPN), a local area network (LAN), a wireless LAN (WLAN), a wide area network (WAN), a metropolitan area network (MAN), a portion of the Internet, or another network 421 or a combination of two or more such networks 150. The present disclosure contemplates any suitable network 150.

One or more links couple one or more systems, engines or devices to the network 150. In particular embodiments, one or more links each includes one or more wired, wireless, or optical links. In particular embodiments, one or more links each includes an intranet, an extranet, a VPN, a LAN, a WLAN, a WAN, a MAN, a portion of the Internet, or another link or a combination of two or more such links. The present disclosure contemplates any suitable links coupling one or more systems, engines or devices to the network 150.

In particular embodiments, each system or engine may be a unitary server or may be a distributed server spanning multiple computers or multiple datacenters. Systems, engines, or modules may be of various types, such as, for example and without limitation, web server, news server, mail server, message server, advertising server, file server, application server, exchange server, database server, or proxy server. In particular embodiments, each system, engine or module may include hardware, software, or embedded logic components or a combination of two or more such components for carrying out the appropriate functionalities implemented or supported by their respective servers. For example, a web server is generally capable of hosting websites containing web pages or particular elements of web pages. More specifically, a web server may host HTML files or other file types, or may dynamically create or constitute files upon a request, and communicate them to client/user devices or other devices in response to HTTP or other requests from client devices or other devices. A mail server is generally capable of providing electronic mail services to various client devices or other devices. A database server is generally capable of providing an interface for managing data stored in one or more data stores.

In particular embodiments, one or more data storages may be communicatively linked to one or more servers via one or more links. In particular embodiments, data storages may be used to store various types of information. In particular embodiments, the information stored in data storages may be organized according to specific data structures. In particular embodiments, each data storage may be a relational database. Particular embodiments may provide interfaces that enable servers or clients to manage, e.g., retrieve, modify, add, or delete, the information stored in data storage.

The system may also contain other subsystems and databases, which are not illustrated in FIG. 1, but would be readily apparent to a person of ordinary skill in the art. For example, the system may include databases for storing data, storing features, storing outcomes (training sets), and storing models. Other databases and systems may be added or subtracted, as would be readily understood by a person of ordinary skill in the art, without departing from the scope of the invention.

System Architecture

Figure 2:
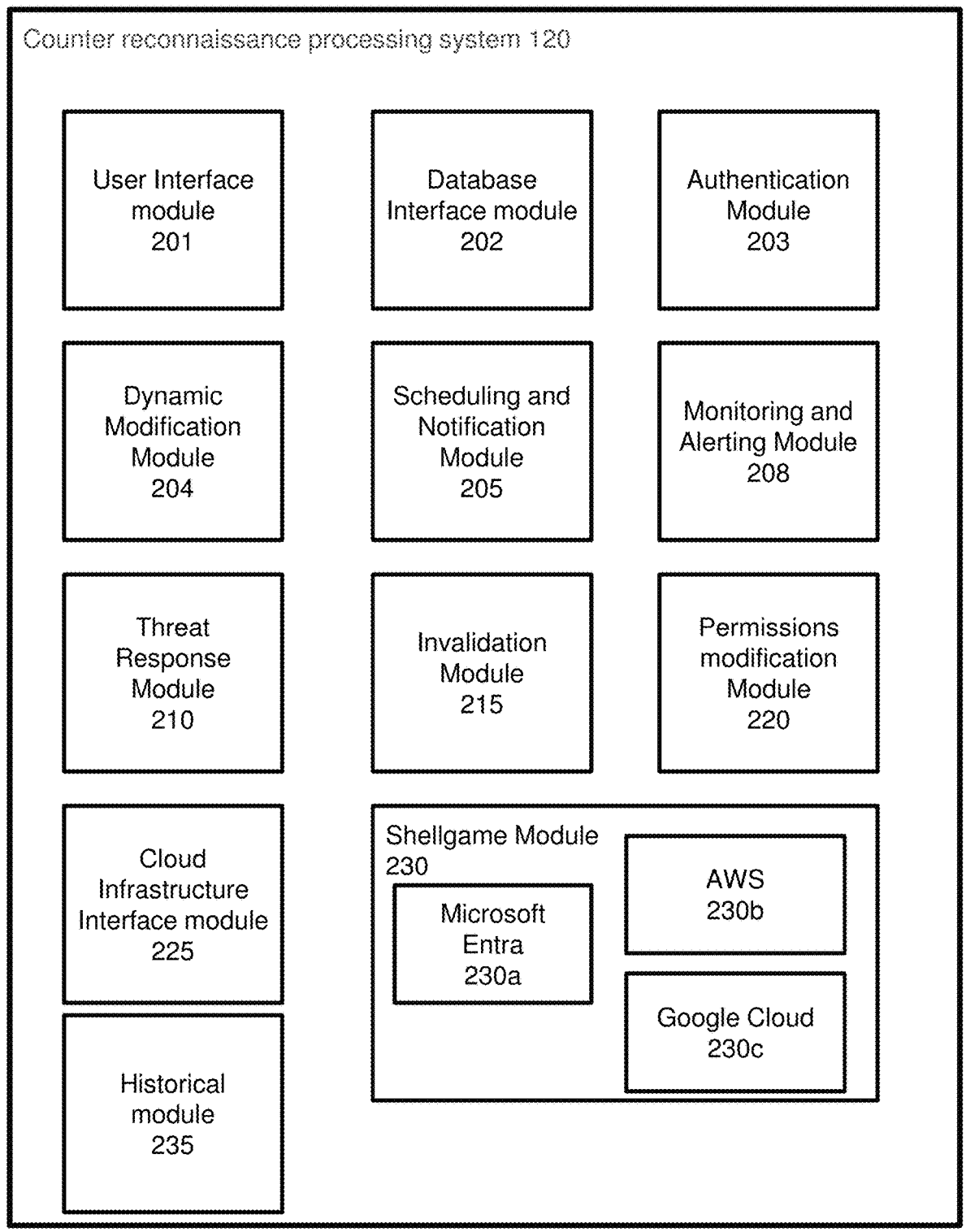
FIG. 2 illustrates a system architecture for systems and methods for counter-reconnaissance in cloud infrastructure to disrupt adversarial targeting, dynamic modification module and monitoring and alerting module in accordance with an exemplary embodiment of the present invention.

FIG. 2 illustrates an exemplary embodiment of the Counter Reconnaissance Processing System 120. The Dynamic Modification Module is responsible for changing user principal names dynamically across multiple cloud platforms— including, but not limited to Microsoft Entra (formerly Azure AD), Amazon Web Services (AWS), and Google Cloud Platform (GCP). This module facilitates the continuous change of usernames, hostnames, and FQDN in order to enhance security through a "Shellgame" function and mechanism. The various components described herein are exemplary and for illustration purposes only and any combination or subcombination of the various components may be used as would be apparent to one of ordinary skill in the art. Other systems, interfaces, modules, engines, databases, and the like, may be used, as would be readily understood by a person of ordinary skill in the art, without departing from the scope of the invention. Any system, interface, module, engine, database, and the like may be divided into a plurality of such elements for achieving the same function without departing from the scope of the invention. Any system, interface, module, engine, database, and the like may be combined or consolidated into fewer of such elements for achieving the same function without departing from the scope of the invention. All functions of the components discussed herein may be initiated manually or may be automatically initiated when the criteria necessary to trigger action have been met.

In one embodiment, the user interface module 201 serves as the primary means for administrators to interact with and manage the system. At a high level, the user interface module 201 provides a comprehensive set of tools and features that enable administrators to effectively configure, monitor, and control the dynamic user identity management system across multiple cloud platforms.

The user interface module 201 offers a range of functionalities designed to streamline the administration process. It allows administrators to register new users, manage user authentication, and configure the dynamic username, hostname, and FQDN modification settings. Additionally, the interface enables administrators to define and manage schedules for automated username, hostname, FQDN updates, ensuring that user identities are regularly obfuscated to enhance security.

To facilitate seamless integration with various cloud platforms, such as Microsoft Entra, AWS, and GCP, the user interface module 201 may include built-in connectors and APIs. These connectors enable the system to retrieve user data from the respective cloud platforms and synchronize the dynamic identity management settings across the entire infrastructure.

The user interface module 201 may incorporate user-friendly widgets that provide visual representations of cloud-based user data. These widgets display real-time information about user identities, allowing administrators to monitor and track the dynamic changes in usernames and other relevant data points. Additionally, the interface may include widgets that highlight expired login attempts, enabling administrators to quickly identify and investigate potential security incidents.

In terms of implementation, the user interface module 201 may be developed using various technologies and frameworks. One approach is to build the interface as a web-based application using modem front-end frameworks such as React, Angular, or Vue.js. These frameworks offer rich user interface components and facilitate the development of interactive and responsive interfaces.

Alternatively, the user interface module 201 may be implemented as a desktop application using frameworks like Electron or Qt. This approach allows for the creation of a standalone application that can be installed and run on administrators' local machines, providing a more native and integrated experience. Another option is to develop the user interface module 201 as a mobile application for iOS or Android platforms. This enables administrators to access and manage the system remotely using their smartphones or tablets, providing flexibility and convenience.

Regardless of the implementation approach, the user interface module 201 communicates with the backend components of the system through well-defined APIs. These APIs allow the interface to retrieve and update user data, trigger dynamic username, hostname, and FQDN modifications, and receive real-time updates on the system's status and security events.

To ensure the security of the user interface module 201, various measures can be implemented. These include, but are not limited to, secure authentication mechanisms, such as multi-factor authentication, to verify the identity of administrators accessing the interface. Additionally, the communication between the user interface and the backend components should be encrypted using standard protocols like HTTPS to protect sensitive data in transit.

In one embodiment, the database interface module 202 manages interactions with a local SQLite database. This module is responsible for ensuring that user information, principal name changes, and invalid login attempts are properly stored and retrieved.

The database interface module 202 may operate by initializing the database and creating tables through the setup_database( ) function. This function is responsible for setting up the database structure, which includes tables such as user_info, user_principal_changes, and invalid_login_attempts.

The user_info table stores user information, including but not limited to usernames, hostnames, FQDN, email addresses, and other relevant user details. The user_principal_changes table records changes to the principal names of users. This includes any modifications to the login usernames used for authentication, hostnames and FQDN. The invalid_login_attempts table logs any unsuccessful attempts to access the systems and identities under protection. This includes instances where outdated or expired usernames, hostname, and FQDN are attempted for use, providing valuable data for tracking and analyzing potential security threats, reconnaissance and targeting.

The database interface module 202 may retrieve data from these tables as required, providing necessary information for other components of the system. For instance, when a user attempts to log in, the module checks the user_info table for matching credentials. If a change in the principal name is detected, the module updates the user_principal_changes table. Similarly, if a login attempt with expired credentials fails, the module logs this in the invalid_login_attempts table.

While the described embodiment uses an SQLite database, other types of databases could also be used depending on the specific requirements of the system. For example, a MySQL or PostgreSQL database could be used for larger systems requiring more robust database management capabilities. Similarly, NoSQL databases such as MongoDB or CouchDB could be used for systems requiring flexibility in data structure and high scalability. The choice of database would depend on factors such as the size of the user base, the volume of data to be managed, and the specific performance and security requirements of the system.

In one embodiment, the authentication module 203 manages a crucial role in managing user authentication and application registration across various cloud services, including Microsoft Entra ID, AWS, and Google Cloud Platform (GCP). At a high level, this module serves as a centralized component for handling authentication-related tasks, ensuring secure access to cloud resources and streamlining the user management and protection process.

The authentication module 203 may provide a range of functionalities to facilitate seamless integration with different cloud platforms. It offers functions for registering applications, allowing administrators to configure and onboard cloud services within the system. This registration process typically involves providing necessary credentials, such as API keys or access tokens, to establish a secure connection between the module and the respective cloud platforms.

Once the applications are registered, the authentication module 203 enables the fetching of user data from the connected cloud services. It communicates with the APIs provided by Microsoft Entra ID, AWS, and GCP to retrieve relevant user information, such as user identifiers, roles, and permissions. This data retrieval process allows the module to maintain an up-to-date view of the user accounts across multiple cloud platforms.

In addition to fetching user data, the authentication module 203 plays a vital role in updating authentication username logins and hostnames and FQDN. It provides functions to modify and manage user credentials, specifically focusing on the dynamic modification of usernames, hostnames, and FQDN. When triggered by the dynamic modification module or other system components, the authentication module 203 securely communicates with the respective cloud platforms to update the usernames, hostnames, and FQDN associated with user accounts.

The authentication module 203 may employ various security measures to ensure the confidentiality and integrity of user data during the authentication and registration processes. It utilizes encryption techniques to protect sensitive information, such as authentication tokens and user credentials, both in transit and at rest. Additionally, the module implements secure communication protocols, such as HTTPS, to establish encrypted channels between itself and the cloud platforms' APIs.

To accommodate different cloud platforms and authentication mechanisms, the authentication module 203 can be designed with a modular architecture. It can include separate submodules or plugins for each supported cloud service, allowing for easy extensibility and customization. This modular approach enables the module to handle the specific authentication requirements and APIs of each cloud platform independently.

The authentication module 203 can also incorporate various authentication methods to cater to different security needs. In addition to enterprise application via OAuth, API keys, Service Accounts, and a username and password-based authentication is supported, and it can support more advanced authentication mechanisms, such as multi-factor authentication (MFA) or single sign-on (SSO) protocols SAML. These alternative authentication methods enhance security by requiring additional factors, such as one-time passwords or biometric data, to verify user identities.

Furthermore, the authentication module 203 can be integrated with external identity providers or directory services, such as Active Directory or LDAP. This integration allows the module to leverage existing user repositories and synchronize user data between the cloud platforms and the organization's internal systems. By centralizing user management, the authentication module 203 simplifies the provisioning and deprovisioning of user accounts across multiple cloud services.

To ensure scalability and performance, the authentication module 203 can be designed to handle a large number of concurrent authentication requests. It can employ caching mechanisms to store frequently accessed user data, reducing the need for repeated API calls to the cloud platforms. Additionally, load balancing techniques can be implemented to distribute authentication requests across multiple instances of the module, ensuring high availability and optimal response times.

The authentication module 203 can also incorporate logging and auditing capabilities to track authentication activities and detect potential security incidents. It can generate detailed logs that capture information such as successful and failed login attempts, user registration events, and usernames, hostnames, and FQDN modifications. These logs serve as valuable data points for security analysis, allowing administrators to monitor and investigate any suspicious activities related to user authentication.

In one embodiment, the dynamic modification module 204 is a system designed to automate and manage the secure modification of usernames, hostnames, and FQDN across multiple cloud platforms. This module enhances user identity management by adding automation and randomization, thereby improving security and complicating adversary targeting efforts. It also provides clear monitoring and alerting capabilities for invalid logins, ensuring that sessions are properly handled and that user security is maintained through session and token invalidation.

The dynamic modification module 204 may operate by automating the process of modifying usernames, hostnames, and FQDN. It interacts with various cloud platforms to change the usernames of users, ensuring that these modifications are secure. The module also manages the sessions associated with these usernames, invalidating old sessions and tokens when a username is changed. This ensures that the old credentials are no longer usable, further enhancing security.

In addition to modifying usernames, hostnames, and FQDN and managing sessions, the dynamic modification module 204 also provides monitoring and alerting capabilities. It monitors for invalid login attempts and alerts administrators when such attempts are detected. This allows administrators to quickly respond to potential security threats.

While the described embodiment automates the modification of usernames, hostnames, and FQDNand manages sessions, other strategies could also be used. For example, the system could manually modify usernames, hostnames, and FQDN, with administrators manually invalidating old sessions and tokens. Alternatively, the system could use a different method for detecting and alerting administrators to invalid login attempts. The specific strategy used would depend on factors such as the desired level of automation, the specific security requirements of the system, and the preferences of the users or administrators.

In one embodiment, the scheduling and notification module 205 provides a vital component in the dynamic modification system, providing advanced automation capabilities for securely and efficiently updating user identities at predefined intervals. At a high level, this module streamlines the process of scheduling and executing identity modifications while keeping stakeholders informed of changes in real-time through a comprehensive set of notification options.

The scheduling and notification module 205 may offer a user-friendly interface that allows administrators to define and configure the timing and frequency of automated identity modification tasks. Through this interface, administrators can specify the desired intervals at which user identities should be updated, such as hourly, daily, weekly, or at custom intervals based on specific requirements. The module provides flexibility in scheduling, enabling administrators to tailor the automation to align with their organization's security policies and operational needs.

The scheduling and notification module 205 may employ scheduling mechanisms to ensure the reliable and timely execution of identity modification tasks. It integrates seamlessly with the dynamic modification module, triggering the necessary processes to update user identities across multiple cloud platforms, such as Microsoft Entra ID, AWS, and Google Cloud Platform (GCP). The module handles the coordination and synchronization of these updates, ensuring that the modifications are applied consistently and securely across all connected systems.

In addition to scheduling, the scheduling and notification module 205 offers a set of notification features to keep stakeholders informed about identity changes in real-time. Administrators can configure various notification channels, such as email, SMS, or instant messaging, to receive alerts whenever user identities are modified. The module can also integrate with existing monitoring and alerting systems, such as SIEM (Security Information and Event Management) tools, to provide centralized visibility and tracking of identity-related events.

The notification functionality of the scheduling and notification module 205 may be customizable, allowing administrators to define the content and format of the notifications based on their preferences. Users can specify the level of detail included in the notifications, ranging from high-level summaries to granular information about specific identity changes. The scheduling and notification module 205 also supports the creation of notification templates, enabling administrators to maintain consistent and professional communication with stakeholders.

The scheduling and notification module 205 may incorporate robust security measures. It employs encryption techniques to protect sensitive data, such as scheduling configurations and notification settings, both in transit and at rest. The module also enforces strict access controls, ensuring that only authorized administrators can configure and manage the scheduling and notification settings.

The scheduling and notification module 205 may be designed with a modular and extensible architecture, allowing for easy integration with various cloud platforms and identity management systems. It can support a wide range of APIs and protocols, enabling seamless communication and data exchange with the dynamic modification module and other relevant components. This modular approach also facilitates the addition of new features and enhancements to the module over time.

To accommodate diverse scheduling requirements, the scheduling and notification module 205 may offer alternative scheduling options beyond fixed intervals. For instance, it can support event-driven scheduling, where identity modifications are triggered based on specific security events or conditions, and also supports the random functionality to allow for unpredictable identity modifications. This allows the system to respond dynamically and proactively to potential threats or suspicious activities, initiating immediate identity updates to mitigate risks.

Another alternative approach is to incorporate machine learning algorithms into the scheduling process. By analyzing historical data and patterns, the module can intelligently determine the optimal intervals for identity modifications based on factors such as user behavior, threat intelligence, and system performance. This adaptive scheduling approach ensures that identity updates are performed at the most effective times, maximizing security while minimizing disruptions to user workflows.

The scheduling and notification module 205 may also provide a comprehensive audit trail of all automated identity modification activities. It can generate detailed logs and reports that capture information such as the time and date of each modification, the specific identities affected, and the status of the update process. These audit trails serve as valuable evidence for compliance and forensic purposes, enabling administrators to demonstrate the effectiveness of their identity management practices and investigate any potential security incidents.

At a high level, the Monitoring and Alerting subsystem 208 is responsible for tracking invalid login attempts, maintaining a historical record of changes to user identities, and providing real-time visualizations and notifications to alert administrators about potential security threats. By proactively monitoring and alerting, the subsystem enables prompt responses to mitigate unauthorized access and unusual activities.

One functionality of the key functionalities of the Monitoring and Alerting 208 subsystem is tracking invalid login or access attempts. The track_invalid_logins( ) function is specifically designed to monitor login attempts for users whose usernames have recently undergone changes. By leveraging the Microsoft Graph API, the function collects relevant data on failed login attempts, including the IP address of the attempt, the time of occurrence, and the reason for the failure. This information provides valuable insights into potential security breaches or unauthorized access attempts.

To ensure continuous monitoring, the Monitoring and Alerting 208 subsystem employs the track_invalid_logins_periodically( ) function, which schedules the tracking task to run at regular intervals, such as, but not limited to, every 5 minutes. This periodic execution guarantees ongoing surveillance of any potentially unauthorized attempts to use outdated credentials after a user's username, hostname, or FQDN has been updated. The track_invalid_logins_and_reschedule( ) function is responsible for executing the login tracking process and then rescheduling it for a future time, ensuring that monitoring remains consistent and uninterrupted.

When an invalid login or access attempt is detected, the add_invalid_login_attempt( ) function comes into play. This function logs the failed login attempt into both the SQLite database, specifically in the invalid_login_attempts table, and the application's user interface. The failed attempts are prominently displayed in the invalid_login_attempts_table widget, providing administrators with a visual overview of recent incidents. The table includes pertinent details such as User Principal Name, IP Address, Attempt Time, Details, and User Agent. By presenting this information, administrators can evaluate the context of failed login attempts and take appropriate actions to address any security concerns.

In addition to logging invalid login attempts, the add_invalid_login_attempt( ) function also adds markers for these incidents to the timeline. This ensures that a historical record of invalid login attempts is maintained, enabling better correlation with other user events and facilitating comprehensive security analysis.

To further enhance the visual representation of invalid login or access attempts, the add_invalid_login_to_timeline( ) function is utilized. This function adds markers for invalid login attempts to the visual timeline, referred to as timeline_figure, providing administrators with a historical view of failed login attempts. Each invalid attempt is represented by a red dot plotted on the timeline, accompanied by labels that include details such as the User Principal Name, IP Address, and the reason for the failed login. This visualization aids administrators in quickly identifying patterns in failed logins, such as repeated attempts on specific dates or at specific times, and provides valuable insights into potentially malicious activities targeting specific user accounts.

The Monitoring and Alerting 208 subsystem may also manage user identity changes. When a user's username is about to be updated through the Shellgame process, the invalidate_old_sessions( ) function is invoked. This function utilizes the Microsoft Graph API to revoke the old sessions and tokens associated with the user's previous credentials. By terminating these sessions and invalidating the tokens, the subsystem ensures that any access using outdated credentials is effectively prevented, mitigating the risk of unauthorized usage.

Furthermore, the invalidate_old_sessions( ) function employs an API endpoint to invalidate all refresh tokens associated with the user. This additional step enhances security by guaranteeing that no previously issued credentials remain valid after a username, hostname or FQDN change. Once the invalidation process is complete, the subsystem initiates the tracking of invalid login attempts for the affected user, enabling the identification of any malicious attempts to use the revoked credentials.

The Monitoring and Alerting 208 subsystem may also incorporate UI and data visualization updates to provide administrators with a comprehensive view of the security landscape. The invalid_login_attempts_table serves as a dedicated table widget in the user interface, displaying detailed information on invalid login attempts. This table empowers administrators to quickly assess and respond to any failed login activities.

Moreover, the update_timeline( ) function is responsible for dynamically updating the visual timeline with changes in user principal names and other relevant events. The timeline offers administrators a clear understanding of the sequence of changes and their relationship to invalid login attempts, facilitating effective security analysis and incident response.

The Monitoring and Alerting 208 subsystem is designed to enhance security across multiple cloud platforms, including but not limited to, Microsoft Entra, AWS, and GCP. It achieves this by tracking invalid login attempts, maintaining a historical record of identity changes, and providing real-time alerts and visualizations. By proactively alerting administrators to potential security threats, the subsystem enables them to take swift action to mitigate unauthorized access and unusual activities.

The tracking of invalid login attempts varies slightly depending on the cloud platform. For Microsoft Entra, the track_invalid_logins( ) function leverages the Microsoft Graph API to monitor failed login attempts for users whose userPrincipalName has recently changed. It collects details such as the IP address of the attempt, the time of occurrence, and the failure reason.

In the case of AWS, login attempts are tracked using AWS CloudTrail, which provides detailed audit logs of all identity-related events. This information is utilized to track login failures for users whose IAM UserName has been recently updated.

For GCP, Google Cloud Logging (formerly Stackdriver Logging) is employed to capture failed login attempts. The subsystem tracks failed login attempts for users whose primaryEmail has been recently updated.

To ensure seamless periodic monitoring across all platforms, the track_invalid_logins_periodically( ) function schedules login tracking to run at regular intervals, such as every 5 minutes. This guarantees continuous monitoring of any unauthorized attempts to use outdated credentials after a user's identity is modified. The track_invalid_logins_and_reschedule( ) function executes the login tracking process for each platform and reschedules it, ensuring consistent monitoring across Microsoft Entra, AWS, and GCP environments.

The threat response module 210 is responsible for detecting and mitigating unauthorized access attempts by malicious actors who attempt to use expired or invalidated credentials. It performs this function by analyzing logs of credential usage, monitoring for patterns consistent with reconnaissance or credential replay, and initiating automated defensive actions when threats are identified. These actions may include blocking IP addresses, disabling user accounts, modifying access permissions, or generating incident reports for administrative review. The module works in conjunction with the monitoring and alerting module 208 to receive real-time data on failed login attempts and correlates this with historical identity change records stored in database 102 to confirm whether the credentials in use are obsolete. As an alternative, threat response actions may be delegated to external security platforms, such as a security information and event management (SIEM) system, endpoint detection and response (EDR) solution, or cloud-native firewall and access control systems that are configured to consume alerts and execute predefined incident response playbooks.

The invalidation module 215 is responsible for ensuring that expired credentials and associated active sessions are rendered unusable immediately following an identity change. It performs this function by programmatically interfacing with identity management APIs across supported cloud platforms—such as Microsoft Entra ID, AWS IAM, and Google Workspace—to revoke access tokens, terminate active sessions, and invalidate refresh tokens tied to the user's previous username, hostname, FQDN or authentication handle. This proactive invalidation ensures that compromised or stale credentials cannot be reused by adversaries after a dynamic modification event. The module is triggered in coordination with the dynamic modification module and uses platform-specific mechanisms like Graph API session revocation, AWS access key deactivation, or Google token revocation endpoints. As an alternative, the system may rely on token expiration policies or periodic reauthentication requirements to passively expire outdated sessions, though this introduces greater exposure windows. Integration with identity federation frameworks or third-party token management services may also be used to centralize credential invalidation in multi-provider environments In one embodiment, the invalidation module 215 subsystem serves as a crucial security component within the Dynamic Modification Module. At a high level, this subsystem is responsible for invalidating user credentials, sessions, and tokens associated with old usernames, hostnames, FQDN or userPrincipalNames (UPNs) immediately before a user's identity is updated. By proactively invalidating these old credentials, the subsystem ensures that any potentially compromised sessions or tokens cannot be used to gain unauthorized access to resources, thereby closing security loopholes.

The core functionality of the invalidation module 215 subsystem is encapsulated in the invalidate_old_sessions( ) function. This function is triggered just before a user's userPrincipalName is modified, and it performs a series of critical steps to invalidate the user's old credentials.

One of the primary tasks of the invalidate_old_sessions( ) function is to interact with the Microsoft Graph API. It leverages the API to revoke active sign-in sessions for the user whose userPrincipalName is about to be changed. By calling the revokeSignInSessions endpoint, the function effectively terminates any ongoing sessions associated with the soon-to-be old usernames, hostnames, and FQDN. This action forces users who are currently logged in using outdated credentials to be automatically signed out, preventing them from continuing to access resources with the old usernames, hostnames, and FQDN.

In addition to revoking sign-in sessions, the invalidate_old_sessions( ) function takes further steps to invalidate refresh tokens tied to the user's old userPrincipalName. Refresh tokens are commonly used to obtain new access tokens without requiring the user to re-authenticate. By invoking the invalidateAllRefreshTokens endpoint of the Microsoft Graph API, the function ensures that all refresh tokens associated with the old usernames, hostnames, and FQDN are rendered invalid. This prevents an attacker from using a previously obtained refresh token to regain access to the user's account after the usernames, hostnames, and FQDN have been updated.

The invalidation process carried out by the invalidate_old_sessions( ) function effectively expires all credentials associated with the old usernames, hostnames, and FQDN. It terminates active sessions and renders old access and refresh tokens unusable. This comprehensive approach guarantees that any attempts to use outdated credentials, whether they are active sessions or stored tokens, will be thwarted. By invalidating these credentials, the subsystem plays a vital role in preventing unauthorized access to organizational resources, even if an attacker has somehow managed to obtain valid credentials prior to the update.

The invalidation module 215 subsystem may be extended or modified to incorporate alternative approaches to session invalidation. One such alternative involves leveraging OAuth claims to manage session validity. Instead of directly calling API endpoints to revoke tokens, the subsystem could embed expiration or invalidation flags within the OAuth tokens themselves. When a userPrincipalName is updated, these claims could be modified to mark all previously issued tokens as invalid. This approach would require customizing the structure and processing of OAuth tokens to accommodate the invalidation mechanism.

Another alternative approach could involve integrating the Invalidating Old Sessions 206 subsystem with Role-Based Access Control (RBAC) systems. In this scenario, the subsystem would dynamically update the roles assigned to a user whenever their userPrincipalName is modified. By altering the user's roles, the subsystem could effectively invalidate any active sessions associated with the previous roles. This approach would be particularly suitable for systems that heavily rely on role-based policies for access control.

The invalidation module 215 subsystem may also be enhanced to include additional security measures. For example, it could be extended to perform a comprehensive audit trail of all invalidated sessions and tokens. By logging the details of each invalidation event, including the user's old and new usernames, hostnames, FQDN, timestamps, and the specific sessions or tokens that were revoked, the subsystem could provide valuable information for security analysis and incident response purposes.

Furthermore, the invalidation module 215 may be designed to integrate with other security monitoring and alerting systems. When a session or token invalidation occurs, the subsystem could trigger alerts or notifications to inform security personnel about the event. This integration would enable prompt investigation and response to any suspicious activities related to the invalidated credentials.

The permissions modification module 220 is responsible for managing and altering user permissions within connected web-based services to reflect changes in identity or access policy. It accomplishes this by interfacing with cloud platform APIs—such as those provided by Microsoft Graph, AWS IAM, and Google Workspace—to read, copy, modify, create, or delete permission sets associated with a user's account. This includes replicating roles from an old username to a new one during identity rotation, adjusting group memberships, or revoking obsolete permissions that could otherwise be exploited by adversaries. The module operates in tandem with the dynamic modification and authentication modules to ensure that permission updates are synchronized with credential changes, maintaining continuity of access where appropriate while minimizing residual privilege. As an alternative, permission changes could be managed manually by administrators or handled through external identity governance tools (e.g., SailPoint, Okta, or Azure Entitlement Management) that provide policy-based control over access rights across federated systems.

The cloud infrastructure interface module 225 is responsible for establishing and managing secure connections between the counter-reconnaissance processing system and various supported cloud platforms. It achieves this by utilizing platform-specific SDKs and APIs—such as Microsoft Graph for Entra ID, Boto3 for AWS, and Google Admin SDK for Workspace—to authenticate, retrieve user data, and execute identity-related operations including username changes, token revocation, and permission updates. The module handles credential management, token refresh, and error handling to ensure reliable communication with each provider's identity services, while also abstracting these platform-specific interactions to present a unified interface to the rest of the system. As an alternative, organizations may use identity federation protocols like SAML or SCIM to synchronize identities across cloud services, or leverage third-party identity orchestration platforms that centralize cloud API interactions, though these approaches may introduce limitations in granularity or responsiveness for dynamic identity modification tasks.

In one embodiment, the Shellgame Module 230 describes the core functionality of the Dynamic Modification Module, which aims to enhance security by regularly modifying user principal names across multiple cloud platforms. At a high level, this module operates by dynamically updating usernames, hostnames, and FQDN, making it challenging for attackers to predict or reuse compromised user credentials. The Shellgame process invalidates old usernames, hostnames, FQDN and sessions, replacing them with new, randomized usernames, hostnames, and FQDN to maintain a robust security posture.

The Dynamic Modification Module seamlessly integrates with Microsoft Entra 230a, AWS IAM 230b, and GCP 230c environments, ensuring consistent and secure modifications of user identities across these platforms. The module leverages platform-specific APIs and libraries to authenticate and interact with the respective identity management systems securely.

In the context of Microsoft Entra 230a, the module utilizes the Microsoft Authentication Library (MSAL) to authenticate and communicate with the Microsoft Graph API. Each user is uniquely identified by an Object ID, such as '6cfcec87-1602-4351-a632-5689144ee0d7', which serves as a stable reference on the backend. The module dynamically updates the UserPrincipalName (UPN) field through the Graph API, effectively modifying the usernames, hostnames, and FQDN used for authentication and identification within the Azure ecosystem.

For Google Cloud Platform (GCP), the Dynamic Modification Module employs Google APIs and OAuth2 credentials to authenticate and update user information via the Directory API. Users are consistently tracked using a unique Object ID, such as '115243463807477460216', while the PrimaryEmail field, which often serves as the username for GCP services, is dynamically updated using the Directory API. This ensures that the user's email is regularly refreshed, making it difficult for attackers to guess or reuse compromised credentials.

When it comes to Amazon Web Services (AWS), the module leverages the Boto3 library to interact with AWS IAM (Identity and Access Management). Users are uniquely identified by their Amazon Resource Name (ARN), such as 'arn:aws:iam::762236750706:user/bob', providing a globally unique reference. The module utilizes AWS API calls to update the IAM UserName and invalidate associated credentials with the current username, including access keys, guaranteeing that no credentials remain valid when the new username has been introduced.

The Dynamic Modification Module 204 offers flexibility in terms of the frequency and timing of username modifications. System administrators can configure the module to perform updates at regular intervals, such as daily or weekly, depending on the organization's security requirements. Alternatively, the module can be triggered to modify usernames based on specific events or conditions, such as detected security breaches or suspicious activity.

In addition to scheduled and event-driven modifications, the Dynamic Modification Module 204 can employ various algorithms and techniques to generate new usernames, hostnames, and FQDN. One approach is to use a combination of random characters, numbers, and symbols to create highly unpredictable usernames, hostnames, and FQDN. Another option is to incorporate user-specific attributes, such as employee ID or department, into the usernames, hostnames, and FQDN generation process, ensuring uniqueness while maintaining a certain level of structure.

To handle scenarios where external systems or applications rely on stable usernames, hostnames, and FQDN, the Dynamic Modification Module can be configured to maintain a mapping between the dynamic usernames, hostnames, FQDN and persistent identifiers. This allows the module to update usernames, hostnames, and FQDN seamlessly while providing a consistent reference for integration purposes, communication purposes, and tracking purposes.

The Dynamic Modification Module 204 can be implemented as a standalone service or integrated into existing identity and access management solutions. It can be developed using programming languages such as Python, Java, or Go, depending on the organization's technology stack and preferences. The module can be deployed on-premises or in the cloud, aligning with the organization's infrastructure setup.

In one embodiment, the Username Generation Strategy is a function designed to generate random usernames, hostnames, and FQDN. This subsystem is responsible for creating unique and unpredictable usernames, hostnames, and FQDN, which enhances the security of the system by making it more difficult for unauthorized users to guess valid usernames, hostnames, and FQDN.

The Username Generation Strategy operates by constructing usernames, hostnames, and FQDN from a combination of adjectives, nouns, and verbs. It follows either an "adjective-noun" pattern, such as "gentlelion", or a "verb-noun" pattern, such as "flyingelephant". The subsystem ensures that each generated usernames, hostnames, and FQDN is unique and does not repeat an already used usernames, hostnames, and FQDN. This approach ensures that the usernames, hostnames, and FQDN are unpredictable, which further improves the security of the system.

The length of the usernames, hostnames, and FQDN are configurable, providing flexibility to adapt to different system requirements. This feature allows the system to accommodate different length restrictions that may be imposed by various platforms or systems.

While the described embodiment uses a combination of adjectives, nouns, and verbs to generate usernames, hostnames, and FQDN, other strategies could also be used. For example, the system could use a combination of other parts of speech, such as adverbs or prepositions, to generate usernames, hostnames, and FQDN. Alternatively, the system could use a random string of alphanumeric characters to generate usernames, hostnames, and FQDN. The specific strategy used would depend on factors such as the desired level of unpredictability, the specific security requirements of the system, and the preferences of the users or administrators. In one embodiment, the Shellgame for Microsoft Entra 203 is a function within the Microsoft Entra (Azure AD) section that changes the userPrincipalName of a given user in Entra ID. This function is designed to enhance security by regularly updating usernames, hostnames, and FQDN, thus making it more difficult for unauthorized users to gain access.

The shellgame( ) function operates through a series of steps. If a specific user_id is not provided, the function prompts the administrator to select a user whose username should be changed. Once a user is selected, the function invalidates the old sessions and tokens using the invalidate_old_sessions( ) function. This step ensures that the old credentials are no longer usable.

Next, the function generates new usernames, hostnames, and FQDN (userPrincipalName) and updates it in the SQLite database (user_info table). The new userPrincipalName is then updated in Microsoft Entra using the Microsoft Graph API. A PATCH request is used to modify the userPrincipalName field for the selected user.

The Shellgame for Microsoft Entra 203 modifies the UserPrincipalName (UPN), a component of user identity in Azure AD. The generated usernames, such as "HappyTiger@example.com" or "JumpingLion@domain.com" or "bphillips-lightningowl@example.com", follow a configurable pattern defined by the system administrator. This ensures that the usernames meet organizational guidelines while maintaining uniqueness.

While the described embodiment uses Microsoft Entra (Azure AD) and SQLite database, other platforms and databases could also be used. The specific platform and database used would depend on the requirements of the system. For instance, other cloud-based identity platforms could be used in place of Microsoft Entra, and other types of databases could be used in place of SQLite. The choice of platform and database would depend on factors such as the size of the user base, the volume of data to be managed, and the specific performance and security requirements of the system.

In one embodiment, the Shellgame for Amazon Web Services (AWS) 230*b* subsystem focuses on dynamically modifying AWS IAM user principal names to enhance security. At a high level, this subsystem interacts with the AWS IAM service to update usernames, hostnames, and FQDN, invalidating previous access keys and sessions associated with the old usernames, hostnames, and FQDN.

The shellgame_aws( ) function 230 plays a central role in the subsystem, handling the process of changing AWS IAM user principal names. When invoked, the function first determines the target user for the update. If a specific user_id is not provided as a parameter, the function prompts the administrator to select an IAM user from the available options. This user selection step ensures that the administrator has control over which user's principal name will be modified.

Once the target user is identified, the shellgame_aws( ) function proceeds to invalidate the current usernames, hostnames, and FQDN sessions and tokens, then update the AWS IAM user's information. It leverages the AWS IAM client, which is part of the Boto3 library, to communicate with the AWS IAM service. The function utilizes the update_user method provided by the IAM service to rename the selected user. The new usernames, hostnames, and FQDN are generated using a similar approach as employed in the Entra shellgame function, ensuring consistency in the generation process.

After successfully updating the AWS username, the shellgame_aws( ) function takes an additional step to maintain data consistency. It stores the new userPrincipalName in the SQLite database associated with the subsystem. This database update ensures that the new username is properly recorded and can be referenced by other components of the system.

In the context of AWS IAM, the subsystem focuses on modifying the IAM UserName, which is a component of the user's Amazon Resource Name (ARN). While the ARN itself remains constant to provide a consistent reference to the user, the IAM UserName undergoes dynamic changes. For example, a username like "AdminJohn" might be transformed into "FuriousElephant". These modifications are performed using the Boto3 library, which facilitates interactions with the AWS API.

One crucial aspect of the Shellgame for AWS subsystems is its impact on access keys, sessions, and tokens associated with the previous username. Prior to a username update, all existing access keys, sessions, and tokens tied to the old username are automatically invalidated. This measure ensures that even if an attacker has previously compromised a username, they cannot continue to use it once the update takes effect. By invalidating these authentication elements, the subsystem significantly reduces the risk of unauthorized access.

To illustrate the functionality of the Shellgame for AWS subsystems, let's consider an example scenario. Suppose there is an IAM user with the ARN 'arn:aws:iam::762236750706:user/adminjohn' and the UserName 'AdminJohn'. When the shellgame_aws( ) function is triggered for this user, it generates a new UserName, such as 'JumpingTiger'. Using the Boto3 library, any existing access keys and sessions associated with 'AdminJohn' are invalidated, effectively preventing any further access using the old username, and the function updates the UserName to 'JumpingTiger' through the AWS API. Simultaneously.

The Shellgame for AWS subsystems can be extended and customized to accommodate alternative approaches. For instance, instead of relying on the administrator to select the target user, the subsystem could be configured to automatically select users based on predefined criteria, such as user roles or last modification timestamps. Additionally, the username generation process could incorporate more advanced techniques, such as using a combination of user-specific attributes and random elements to create highly unique and unpredictable usernames.

Another alternative approach could involve integrating the Shellgame for AWS subsystem with other security mechanisms, such as multi-factor authentication (MFA). In this case, the subsystem could enforce MFA for users whose usernames have been recently modified, adding an extra layer of security to prevent unauthorized access attempts.

Furthermore, the subsystem could be extended to include logging and auditing capabilities. By recording the details of each username, hostname, and FQDN modification, including the old and new usernames, hostnames, FQDN, timestamps, and the administrator responsible for the change, the subsystem can provide valuable audit trails for security analysis and compliance purposes.

In one embodiment, the shellgame_gcp( ) function 230 is designed to change Google Workspace 230*b* user principal names, enhancing security by providing users with new and unpredictable email addresses for authentication. This subsystem automates the process of updating user identities within the Google Cloud Platform (GCP) environment, specifically targeting the modification of the primaryEmail field in Google Workspace.

The process begins with user selection. If no user_id is provided, the administrator is prompted to select a user from a list of users stored in the local database. Once a user is selected, the Google Directory API is employed to update the user's primary email address (primaryEmail) which is actually used for authentication. This change helps ensure that the GCP user identity aligns with the newly generated usernames, hostnames, and FQDN, thereby enhancing the security of user accounts.

Following the update on GCP, 230c the subsystem also updates the userPrincipalName in the SQLite database. This step ensures that the local records are consistent with the changes made on the cloud platform. Example modifications might include changing usernames, hostnames, and FQDN to formats like "SilentSnow @domain.com" or "RollingRiver@organization.org". The use of the Directory API facilitates these modifications and ensures that changes are synchronized with GCP's user management system.

In addition to updating usernames, hostnames, and FQDN, the subsystem takes measures to invalidate all previous sessions and tokens associated with the outdated email prior to the change. This step helps to prevent unauthorized access or misuse of the old credentials as-is (existing sessions) and in the future (targeting by the adversary).

Alternatives to this approach include manual updates of user principal names, which would require administrators to individually change each user's primaryEmail field through the Google Admin console. Another alternative could involve the use of batch processing scripts that run outside of the primary system to update user identities in bulk. These scripts could interact with the Google Directory API in a similar manner but would operate independently of the main software system. The choice between these alternatives could depend on factors such as the volume of users needing updates, the level of automation desired, and the specific operational practices of the organization.

In one embodiment, the historical records 235 subsystem is a key component within the Dynamic Modification Module. This subsystem is tasked with logging every instance where a user's userPrincipalName (username) is altered. It achieves this by creating entries in the user_principal_changes table of an SQLite database. Each entry documents the user_id of the affected user, both the old and new userPrincipalName values, and the precise date and time (change_date) of the modification. This functionality ensures a comprehensive audit trail of identity changes, aiding administrators in auditing changes and linking modifications to other system events, such as failed login attempts.

The process operates as follows: whenever a user's userPrincipalName is updated via the Dynamic Modification Module, a new record is added to the user_principal_changes table in the SQLite database. This record includes the user's unique ID, the previous userPrincipalName, the new userPrincipalName, and the timestamp of the change. This approach ensures a persistent, accessible record of all usernames, hostnames, and FQDN changes, providing valuable data for monitoring, security analysis, incident correlation, and system debugging.

For instance, if a user, Jane Doe, has her userPrincipalName changed from "jane.doe@domain.com" to "HappyLion@domain.com", the system logs this change in the user_principal_changes table with her user ID, both the old and new usernames, hostnames, and FQDN, and the change date. This historical record serves multiple purposes, including providing an audit trail for compliance, aiding in security analysis by tracking invalid login attempts, facilitating incident correlation, and assisting in system debugging. It also helps in quickly resolving user issues by informing administrators of recent usernames, hostnames, and FQDN changes.

Alternatives to using a SQLite database for tracking username, hostname, and FQDN changes include cloud-based logging and distributed database solutions. Cloud-based databases or logging services such as AWS RDS, Google Cloud Firestore, or Azure Cosmos DB offer scalability, reliability, and centralized management, making them suitable for systems requiring more robust data handling capabilities. On the other hand, a distributed database like Apache Cassandra could provide redundancy and high availability, beneficial for large-scale systems with extensive user bases. These alternatives offer different advantages in terms of scalability, management, and availability, depending on the specific requirements of the system.

In one embodiment, the subsystem for maintaining historical records of username, hostname, and FQDN changes 235 is a key component within the Dynamic Modification Module. This subsystem is tasked with logging every instance where a user's userPrincipalName (username) is altered. It achieves this by creating entries in the user_principal_changes table of an SQLite database. Each entry documents the user_id of the affected user, both the old and new userPrincipalName values, and the precise date and time (change_date) of the modification. This functionality ensures a comprehensive audit trail of identity changes, aiding administrators in auditing changes and linking modifications to other system events, such as failed login attempts.

The process operates as follows: whenever a user's userPrincipalName is updated via the Dynamic Modification Module, a new record is added to the user_principal_changes table in the SQLite database. This record includes the user's unique ID, the previous userPrincipalName, the new userPrincipalName, and the timestamp of the change. This approach ensures a persistent, accessible record of all usernames, hostnames, and FQDN changes, providing valuable data for monitoring, security analysis, incident correlation, and system debugging.

For instance, if a user, Jane Doe, has her userPrincipalName changed from "jane.doe@domain.com" to "HappyLion@domain.com", the system logs this change in the user_principal_changes table with her user ID, both the old and new usernames, hostnames, FQDN, and the change date. This historical record serves multiple purposes, including providing an audit trail for compliance, aiding in security analysis by tracking invalid login attempts, facilitating incident correlation, and assisting in system debugging. It also helps in quickly resolving user issues by informing administrators of recent username, hostname, and FQDN changes.

Alternatives to using a SQLite database for tracking username, hostname, and FQDNchanges include cloud-based logging and distributed database solutions. Cloud-based databases or logging services such as AWS RDS, Google Cloud Firestore, or Azure Cosmos DB offer scalability, reliability, and centralized management, making them suitable for systems requiring more robust data handling capabilities. On the other hand, a distributed database like Apache Cassandra could provide redundancy and high availability, beneficial for large-scale systems with extensive user bases. These alternatives offer different advantages in terms of scalability, management, and availability, depending on the specific requirements of the system.

Computer Implemented Process

Figure 3A:
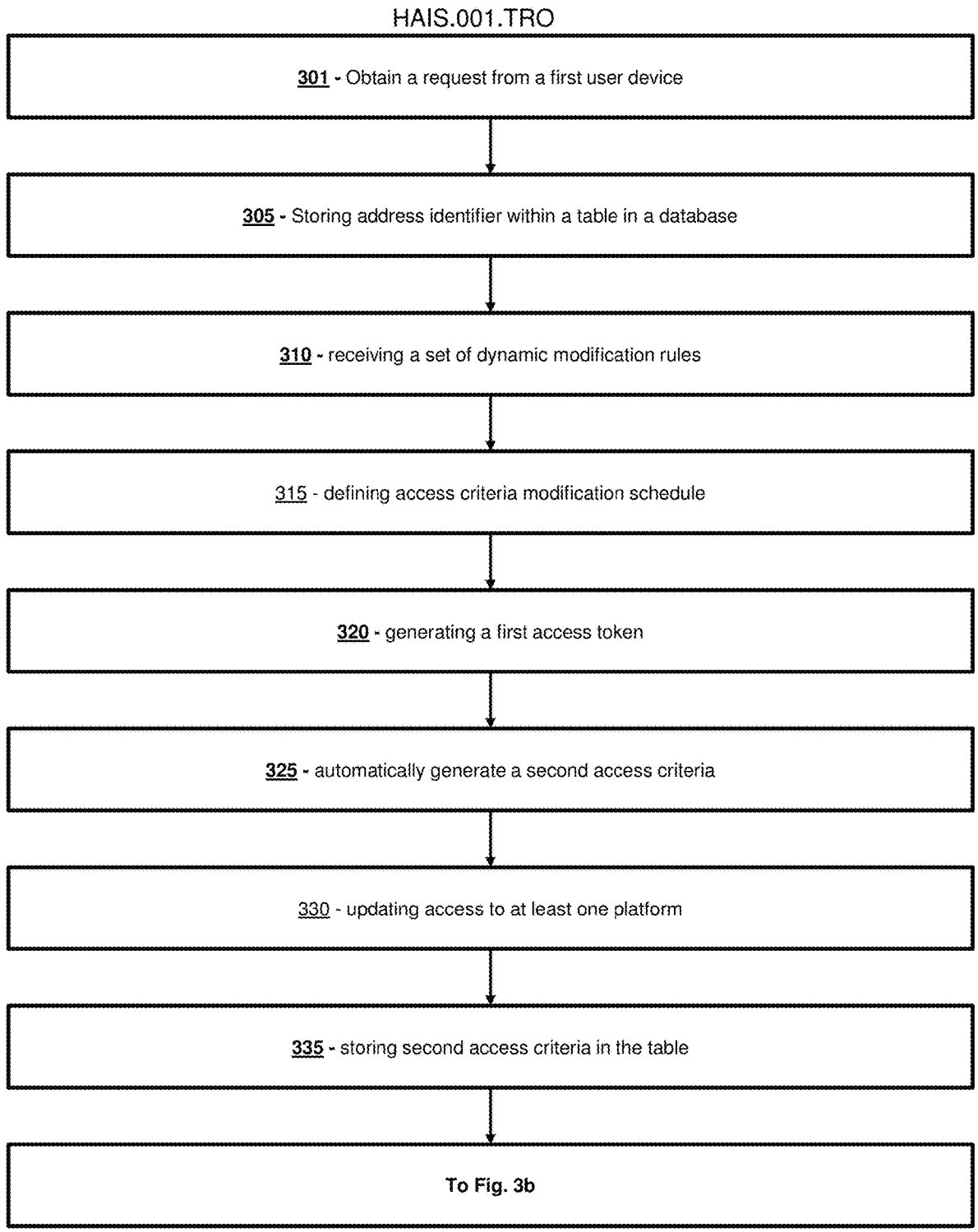
FIGS. 3*a* and 3*b* illustrate an exemplary computer implemented process for systems and methods for counter-reconnaissance in cloud infrastructure to disrupt adversarial targeting according to one embodiment of the invention.
Figure 3B:
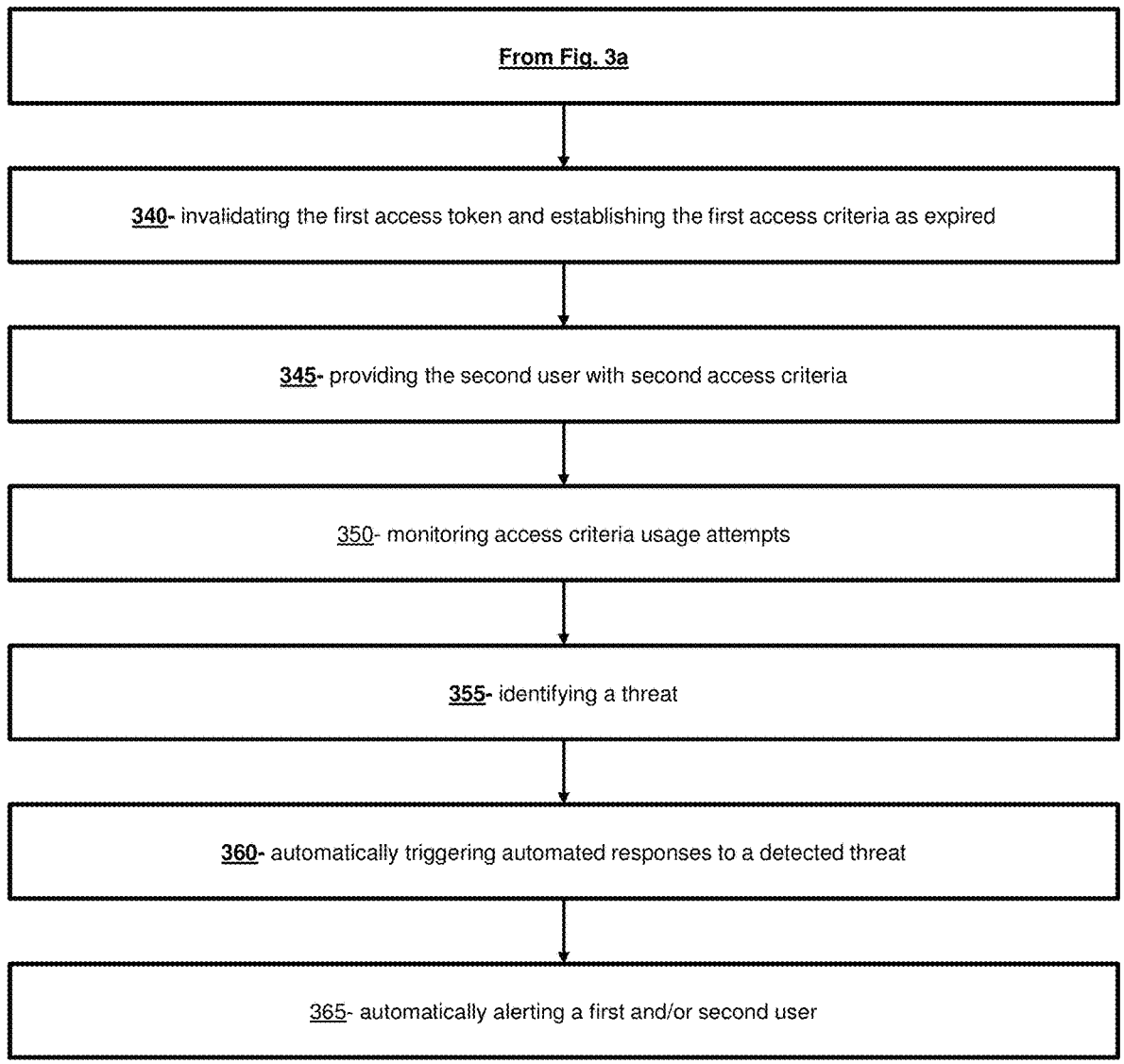

FIG. 3 illustrates an exemplary computer-implemented process for dynamically modifying user access criteria and executing automated counter-reconnaissance measures in response to unauthorized credential usage. The process begins with obtaining a request from a first user device and proceeds through steps for storing identity information, applying modification rules, updating access credentials, and triggering responsive actions upon threat detection. Specifically, the process comprises the following steps: (1) obtaining a request from a first user device (step 301); (2) storing an address identifier within a table in a database (step 305); (3) receiving a set of dynamic modification rules (step 310); (4) defining an access criteria modification schedule (step 315); (5) generating a first access token (step 320); (6) automatically generating a second access criteria (step 325); (7) updating access to at least one platform (step 330); (8) storing the second access criteria in the table (step 335); (9) invalidating the first access token and establishing the first access criteria as expired (step 340); (10) providing a second user with the second access criteria (step 345); (11) monitoring access criteria usage attempts (step 350); (12) identifying a threat (step 355); (13) automatically triggering automated responses to a detected threat (step 360); and (14) automatically alerting a first and/or second user (step 365).

At a high level, Obtaining a Request from a First User Device 301 involves initiating the process by receiving an input or access request from a user device. The system captures this request as a trigger to initiate identity monitoring or credential management operations. This request may include login attempts, access to a secure resource, or initiation of a credential update workflow. The request may be captured through an application interface or API endpoint that communicates with the counter-reconnaissance processing system. The request may include authentication data, device metadata, timestamp information, and identifiers such as usernames, hostnames, FQDN or email addresses. The system logs the request and passes the relevant parameters into downstream processing modules.

As a non-limiting alternative, the request may originate from an administrative console, a scheduled system task, a webhook from a cloud provider, or a passive monitoring system detecting suspicious activity. In other embodiments, the request may be triggered automatically based on user behavior analytics or by scheduled rotation policies without direct user interaction.

In an embodiment of the invention, Obtaining a Request from a First User Device 301 involves an administrator interacting with the User Interface (UI) to manage and monitor user identities within the system. At a high level, this step may involve the administrator launching a graphical interface that serves as the main control panel for performing various operations related to user identity management, task scheduling, modification visualization, and overall system monitoring.

Obtaining a Request from a First User Device 301 involves the administrator launching the system's User Interface, typically in the form of a dashboard application. This dashboard provides a comprehensive set of functionalities designed to streamline identity management and system administration.

One of the key features of the UI is its identity management capabilities. The interface allows the administrator to register cloud applications, such as Microsoft Entra, AWS, and GCP, and manage user credentials associated with these applications. The administrator can perform actions like modifying usernames, hostnames, and FQDN or setting specific security measures through the UI, providing a centralized control point for identity management across multiple cloud platforms.

In addition to identity management, the UI offers scheduling functionality. Administrators can set up schedules for various tasks, such as automated updates, username modifications, or session invalidations. The UI provides options to specify the frequency of these recurring tasks, enabling administrators to define schedules on a daily, hourly, or custom basis, or randomly.

The UI also includes visualization features that display timelines of changes made to user identities. This allows administrators to easily keep track of modifications, such as newly assigned usernames, hostnames, FQDN, revoked tokens, or invalid login attempts of expired credentials. The visualization may be presented in the form of tables or charts, providing a clear representation of identity events over time.

To facilitate intuitive navigation and user interaction, the UI incorporates various buttons and a well-structured layout. Buttons like "Register Entra Application," "Shellgame," and "Schedule Configuration" initiate specific workflows, allowing administrators to quickly access and perform desired actions. The layout of the UI is organized into sections, including areas for displaying identity details and visual tools like charts, ensuring a user-friendly experience.

While the graphical User Interface is the primary means of interaction in this embodiment, alternative approaches can be considered. One alternative is to employ a Command Line Interface (CLI) instead of a graphical UI. With a CLI, the administrator would interact with the system by typing commands to execute actions such as user management or schedule configuration. Although less user-friendly compared to a graphical interface, a CLI can be more efficient for experienced administrators who are comfortable with command-based interactions.

Another alternative is to implement the UI as a web-based portal accessible through a web browser. This approach offers greater flexibility, as the administrator can manage identities from any device with internet access, without being tied to a specific platform. A web-based portal allows for remote management and enables administrators to perform tasks from various locations.

An API-based management approach could also be considered as an alternative to direct UI interaction. In this case, administrators would interact with the system programmatically using APIs. They could create scripts that utilize API calls to handle identity management, configuration, and visualization tasks. While this method requires programming knowledge, it offers the potential for automation and integration with other systems.

The User Interface could be provided as a mobile application, allowing administrators to manage tasks on the go. A mobile app interface would be beneficial for administrators who require real-time access to manage and respond to system changes, even when they are away from a traditional workstation environment. This alternative offers flexibility and convenience, enabling administrators to perform critical tasks from their mobile devices.

Storing Address Identifier Within a Table in a Database 305 involves persisting the identity data associated with the user request into a database for future reference and tracking. At a high level, the system records key identifying attributes that can later be used to validate, modify, or invalidate user credentials.

The address identifier, which may include, but is not limited to, a username, email address, IP address, or user principal name, is stored in a structured format in a database table. The system may include a dedicated table, such as user_info or access_records, with fields for user ID, credential data, timestamps, and related metadata. This storage step ensures a reliable point of reference for subsequent operations involving the user's identity.

In other embodiments, the identifier may be stored in a distributed database, a cloud-based directory service, or in-memory cache systems with persistent backup. The identifier may also be cross-referenced with existing records to update or merge previous identity data associated with the same user.

At Receiving a Set of Dynamic Modification Rules 310, the system retrieves or accepts a set of rules that govern how user credentials or access criteria should be modified. These rules define the behavior of the system for rotating or transforming access parameters in response to routine operations or detected threats. If the set of rules is not provided by a user, the system may retrieve a default set of rules to use for the process The rules may be retrieved from at least one of a preconfigured policy file, a dynamic configuration engine, or a user-defined interface. Rules may specify parameters such as rotation frequency, acceptable username, hostname, and FQDN structures, password expiration policies, notification methods, and triggers for conditional identity changes. These rules are parsed and loaded into the processing system for execution. It allows for the setting of credential modification schedules at configurable intervals, such as every minute, hour, day, month, or at random. The administrator can configure the frequency of the modification function via the UI Module, choosing from intervals like every minute, hour, day, month, or even custom/random schedules. A timer is employed to handle the scheduling within the application. Once an interval is selected, the timer is initialized to periodically trigger the credential modification process according to the set schedule. Administrators have the capability to start, pause, edit, or delete schedules. This flexibility allows for adjustments to be made in response to evolving security requirements or operational needs. For example, schedules can be paused during system maintenance periods.

The process may send notifications about modifications through selected channels, which can include SMS, physical mail delivery, email, enterprise tools like Microsoft Authenticator or Signal, phone calls for voice confirmation, or syslog messages for enterprise system logging to notify the affected users. These notifications provide details such as the updated credential information, modification date and time, and any necessary actions for the user. The step may also incorporate logging and error handling as fail-safe mechanisms to ensure the reliability of updates. If an update encounters an error, the system logs the incident and notifies administrators.

Alternative approaches to the described embodiment include the use of external task schedulers like Celery or Apache Airflow, which offer enhanced reliability and fault tolerance for distributed environments. Cloud-based scheduling services, such as AWS EventBridge, Azure Scheduler, or Google Cloud Scheduler, could also be utilized to manage and execute scheduled jobs, providing high availability and offloading scheduling infrastructure management. Cron jobs represent another alternative, offering a straightforward method for setting up repetitive tasks in Unix environments.

In alternative embodiments, rules may be received via an administrative interface, pushed from a policy orchestration service, or dynamically derived from user behavior and security posture assessments. Rules may be expressed in a policy definition language, stored as JSON or XML, or retrieved from a rules engine or third-party identity governance platform.

Defining Access Criteria Modification Schedule 315 involves determining the timing and conditions under which the system will modify access credentials or identity attributes. At a high level, the system builds a schedule for applying changes in accordance with the modification rules received. The schedule may include fixed intervals (e.g., daily, weekly), randomized intervals, or event-based triggers such as detection of failed login attempts, role changes, or system alerts. The scheduling engine uses internal timers or event listeners to determine when to initiate credential changes and communicates these triggers to the appropriate modules.

Generating a First Access Token 320 involves the issuance of an initial access credential, such as a token, to authorize access to the relevant system or service. The access token is used to authenticate the user during their session.

The system may use platform-specific methods to generate the token. For example, in Microsoft Entra, the system may call OAuth2 APIs to issue bearer tokens. In AWS, the token may be issued via Security Token Service (STS). The token contains encrypted or signed data validating the user's access rights, expiration time, and scope.

As a non-limiting alternative, the token may be generated using custom JWTs, SAML assertions, or API keys depending on the integration. The token may be generated locally or delegated through a federated identity provider, and may be stored in local memory, browser storage, or hardware security modules.

Generating a First Access Token 320 is designed to securely authenticate with various cloud platforms such as Microsoft Entra, AWS, and Google Cloud Platform (GCP). This process uses specific authentication libraries, such as MSAL for Entra, Boto3 for AWS, and Google APIs for GCP, to establish secure connections and obtain access tokens. These tokens are then used to fetch user data and integrate it into the system for further management and analysis.

During the Microsoft Entra Authentication, the system utilizes the Microsoft Authentication Library (MSAL) to securely connect with Microsoft Entra ID. The process begins by requesting credentials, such as the client ID, client secret, and tenant ID, and using these to generate an access token, ending up in the creation of a reusable OAuth 2.0 application registration. This token allows the application to interact with Microsoft Graph APIs to fetch user data, including user profiles, groups, and roles.

In the AWS Authentication step, the system uses Boto3, the AWS SDK for Python, to authenticate with AWS. The administrator is prompted to provide AWS credentials, such as the access key ID and secret access key. These credentials are used to establish a session with AWS Identity and Access Management (IAM) services, from which user information can be fetched.

For the Google Cloud Platform (GCP) Authentication, the Google API libraries are used to authenticate via OAuth 2.0. Administrators are prompted to select a JSON file with credentials that define permissions and access scopes. Once authenticated, Google APIs can be called to retrieve user data from the Google Admin SDK, including user details, organizational information, and access levels.

Each of these platforms issues an access token after successful authentication, which the system stores and uses to make authorized API requests to fetch user data. Tokens are refreshed or re-authenticated when they expire.

While the described embodiment uses specific authentication libraries for each platform, other methods could also be used. For instance, service accounts with predefined permissions could be used instead of prompting for credentials on initial application registration. This approach allows the authentication process to be automated in another way, reducing administrative workload. Alternatively, command line authentication tools provided by each cloud vendor could be used to authenticate manually. For example, 'aws configure' for AWS or 'gcloud auth' for GCP could be employed. This would require administrators to use terminal commands to manually authenticate before initiating other processes. Another alternative is certificate-based authentication, which uses digital certificates instead of traditional credentials. The certificate, issued by a trusted Certificate Authority (CA), is used to establish secure and trusted communications between the system and the cloud platforms.

At Automatically Generate a Second Access Criteria 325, the system generates a replacement or alternative access credential—such as a new username, hostname, FQDN, token, or role—based on the modification schedule and rules. The second access criteria is designed to replace the first, rendering the prior credential obsolete. This may involve using a configured generation logic or algorithm to generate new usernames, hostnames, and FQDN (e.g., adjective-noun format), issuing a new access token with updated privileges, or changing group memberships. The system ensures that this new credential is valid and recognized by the appropriate cloud identity providers.

The generation logic within the step utilizes dictionaries to craft randomized usernames, hostnames, and FQDN. Administrators have the flexibility to customize and configure these dictionaries with specific words or themes to meet organizational standards. The generation process involves selecting random words from each category to form a unique identifier, which could follow an adjective-noun (e.g., "bouncyShadow") or a verb-noun (e.g., "runningRiver") format. The system is designed to produce usernames, hostnames, and FQDN of varying lengths, typically between 8 to 16 characters, to add another layer of randomness.

To ensure uniqueness, the process may check the generated usernames, hostnames, and FQDN against existing ones in a local database (SQLite). If a match is found, the process generates new usernames, hostnames, and FQDN. This verification step may prevent duplication and ensure each user is assigned a distinct identity over the lifecycle of the protected entity/human user identity.

The credential update workflow is integral to the module's operation. After generating new usernames, hostnames, and/or FQDN, it replaces the existing user principal name in the database and across cloud platforms such as Microsoft Entra, AWS IAM, or Google Cloud Directory through API integrations. This ensures that credentials remain synchronized across services. The "Shellgame" operation, a component of this module, schedules username updates, invalidates old usernames, and notifies users of their new credentials. While consistently synchronizing the new username across clouds is the default, one can also configure the system to do per-cloud unique usernames.

For example, a user's username might transition from john.doe@company.com to dancingLion@company.com during a shellgame operation. This change enhances security by reducing predictability through frequent username rotations. Importantly, while the authentication username changes, communication channels like email communication to the original email address remain unaffected. It is only the authentication login information that is changed for improved security.

Alternative approaches may involve dictionary-based generation, which utilizes dynamic dictionary sources reflecting specific themes or categories. This allows for customization based on the needs of individual departments or teams within an organization.

Another approach may employ machine learning techniques to generate sophisticated and unpredictable usernames, hostnames, and FQDN. By leveraging machine learning models, the system can potentially learn from past naming conventions to avoid exploitable patterns, thereby enhancing security.

A third approach may use Universally Unique Identifiers (UUIDs) as the basis for generation. While this method ensures uniqueness, it may come at the cost of reduced readability and user-friendliness compared to other approaches.

The process may also implement a centralized service, which would manage generation and duplication checks across multiple platforms and systems. This centralized approach guarantees global uniqueness and eliminates the risk of duplicate usernames, hostnames, and/or FQDN across different applications or services within an organization.

Lastly, the process may incorporate domain-specific attributes into the generation process. By including elements such as department codes, the resulting usernames, hostnames, and FQDN can facilitate internal identification while still maintaining the necessary security measures. This approach strikes a balance between user-friendliness and the need for secure, unique identifiers within an organization.

In alternative embodiments, the second access criteria may be selected from a pre-approved pool, manually configured by an administrator, or generated using pseudorandom functions, cryptographic signatures, or user behavior-derived patterns.

The process may generate new, unique usernames, hostnames, and FQDN using a predefined logic. The new usernames, hostnames, and FQDN are then updated across the various platforms. In Microsoft Entra, the user's profile is updated with the new userPrincipalName using the Microsoft Graph API. For AWS, the Boto3 library facilitates interaction with IAM to update the user's username. In GCP, the Google Admin SDK is used to modify the user's primary email address to the new username. Additionally, the local SQLite database is updated to reflect these changes, maintaining consistency across records.

In the event that the access token for any platform expires during the process, the process may re-authenticate using the respective libraries (e.g., MSAL for Microsoft Entra or Google OAuth2 for GCP) to ensure that modification operations proceed with the necessary permissions.

At Updating Access to at Least One Platform 330, the system applies the new access criteria to one or more connected cloud platforms. This ensures the modified identity information is propagated across the necessary services.

This update is typically conducted using API calls to the identity management services of platforms such as Microsoft Entra, AWS IAM, or Google Admin SDK. The system may update the userPrincipalName, regenerate permissions, or modify directory entries. Credentials are also synchronized to ensure consistency.

As an alternative, updates may be pushed through SCIM provisioning endpoints, LDAP synchronization tools, or through orchestration layers that manage multiple platforms in parallel. In some cases, local system configurations or internal access control lists may also be updated.

At Storing Second Access Criteria in the Table 335, the new access credential is generated and applied, it is stored in the database to maintain a historical and auditable record. This ensures that the system can track credential lineage and support future correlation of access attempts.

The second access criteria may be written into the same database used in earlier steps, along with timestamps, user identifiers, and the reason for credential rotation. This allows future access attempts to be evaluated against both current and expired credentials.

In alternative embodiments, the credential may be stored in a dedicated audit database, an external identity governance platform, or in a distributed logging system such as Elasticsearch or AWS CloudWatch.

In one embodiment, Storing Second Access Criteria in the Table 335 may securely store and track user data collected from various platforms, such as Microsoft Entra, AWS, and GCP. This step manages identity credentials, records modifications, and maintains an audit trail, providing comprehensive tracking of changes to user accounts.

The process may employ an SQLite database to store and manage user information. The database is structured with tables designed to include fields such as, but not limited to, user ID, email, display name, job title, mobile phone, office location, and preferred language. The structure may also accommodate a detailed log of user identity modifications, including changes to user principal names.

Data may be fetched from cloud platforms during the generation of a first access token and then processed and inserted into the database. Different functions are responsible for data insertion. For instance, when users are fetched from platforms, they are saved in the user_info table, which stores static user data like name, job title, and email. Any modification to user identity information, such as username changes, is recorded in the user_principal_changes table. This provides an audit trail to track the history of changes and facilitates compliance requirements. The invalid_login_attempts table stores information about unauthorized access attempts with old usernames, helping administrators monitor and take action on potential security threats.

The process may provide query functions to access and display stored data. For instance, the UI module uses these queries to populate tables that show user information or a detailed timeline of modifications. To ensure integrity, data is inserted using the INSERT OR REPLACE strategy, which helps avoid duplicate entries and keeps user information up-to-date. Transactions are used to guarantee that multiple data operations occur reliably, reducing the risk of partial updates.

While the described embodiment uses SQLite, other database systems could also be used. For instance, a cloud-hosted database service such as Amazon RDS, Azure SQL Database, or Google Cloud Firestore could be used. These cloud-hosted databases provide benefits like scalability, high availability, and automated backups, which are helpful for larger-scale implementations. Alternatively, a NoSQL database, such as MongoDB or DynamoDB, could be used to handle user data. This would be particularly useful if the data structure needs to be more flexible, such as storing additional attributes that vary across different users. NoSQL can also improve performance when dealing with unstructured data or frequent schema changes.

Storing Second Access Criteria in the Table 335 maintains an audit trail within the SQLite database, logging details of the original usernames, hostnames, and FQDN and each change, including the old and new usernames, hostnames, and FQDN and the modification date. After modifications, a synchronization check is performed across all systems to ensure that the updates are accurately reflected, preventing any discrepancies.

Alternatives involve using a centralized Access Management Solution, such as Okta or Auth0, to manage user identities and invalidate sessions across multiple systems through a unified mechanism, simplifying the revocation process. Another approach may use certificate-based authentication, where modifications would entail generating and distributing new certificates while invalidating the old ones, offering an additional security layer. Lastly, utilizing Federated Identity Management with Single Sign-On (SSO) could simplify the management of identity changes across platforms by abstracting modifications through federated identity providers, ensuring consistency of user identities.

Invalidating the First Access Token and Establishing the First Access Criteria as Expired 340 ensures that the prior access credential is no longer valid, preventing unauthorized reuse. The system programmatically revokes or deactivates the original token or credential set. Revocation may be accomplished through API calls such as Microsoft Graph's revokeSignInSessions, AWS IAM's deleteAccessKey, or Google's token revocation endpoints. The system marks the original credential as expired in the database and removes any active sessions associated with it. Invalidation may prevent the potential misuse of old, compromised tokens following the modification. For Microsoft Entra, the module utilizes the Microsoft Graph API to revoke existing sessions and invalidate refresh tokens. In AWS, the module interacts with AWS IAM to revoke sessions appropriately. For GCP, session termination and credential revocation are handled using the Google Admin SDK.

As a non-limiting alternative, credential invalidation may be implemented through session timeouts, token blacklists, access control list edits, or disabling user accounts entirely. The system may also rely on token expiration parameters where immediate revocation is not possible. The system may also detect when a credential is used and begin a timer to invalidate the session after a predetermined or preset time. Additionally, the invalidation may occur so that once a credential is used, it is invalidated immediately afterwards, creating a one time use case for the credential.

At Providing the Second User with Second Access Criteria 345, the updated access credentials are securely delivered to the authorized user or administrative contact. This step ensures continuity of access while maintaining security controls. Delivery may occur via email, SMS, encrypted messaging platforms, mobile authenticator apps, or secure portals. The system selects the method based on configuration, user profile preferences, or security policies. In high-security settings, offline methods such as verbal delivery or printed credentials may be used. The notification process is designed to be flexible, allowing for customization of the notification content, which includes the new login username, the modification's date and time, and instructions for the user if any actions are required. A central function manages the notification process, taking inputs such as the modified username, user contact information, and the preferred notification channel.

To accommodate diverse user preferences, the process may support several notification channels. These include SMS, which enables direct notifications to the user's mobile device through integration with an SMS gateway; email, which sends comprehensive notifications to the user's email address using an SMTP server or email API; smartphone app notifications, which send push notifications directly to associated authentication or messaging apps via their APIs; and enterprise tools, which dispatch notifications through communication tools like Microsoft Teams or Slack using webhooks or API calls.

The process may authenticate with each notification service and adhere to privacy standards. This includes using mechanisms like 2FA for SMS gateways or OAuth 2.0 for email APIs. Messages, especially those containing new usernames or sensitive data, are encrypted prior to dispatch across any channel, safeguarding user information during transit.

Users or administrators may designate a preferred notification channel. In scenarios where no specific preference is indicated, the system might deploy notifications across multiple channels to ensure the message reaches the user. For significant changes, the module may require users to acknowledge receipt of the notification, with the system logging these interactions for audit purposes.

In other embodiments, credentials may be accessed through a self-service portal, obtained via an API call, or delivered to an administrator who then relays them to the end user through trusted channels. An alternative approach may involve leveraging a unified messaging platform to streamline notification management by consolidating SMS, email, and app notifications into a single service. Another approach may utilize in-app notifications within the User Interface Module to centralize information dissemination, requiring users to log in to view updates. Voice call notifications through services like Twilio Voice can offer a direct method of informing users, particularly those who may not regularly check text-based messages. For heightened security, issuing notifications through physical tokens or smartcards provides a tangible method of informing users of credential changes, minimizing electronic interception risks. Lastly, employing system notifications within an enterprise setting can ensure immediate user awareness upon device login, facilitated by management services like Intune or Jamf, eliminating the need for external communication channels.

For notifications, a simplified approach may involve using webhooks to send notifications to a central system responsible for managing user notification methods. Alternatively, dedicated notification services like Twilio for SMS, SendGrid for email, or Microsoft Teams for enterprise messaging could be employed to handle all aspects of user notifications, offering scalability, security, and reducing internal management overhead.

At Monitoring Access Criteria Usage Attempts 350, the process begins actively monitoring for attempts to use either the current or expired access credentials. This step is critical for detecting potential reconnaissance, replay attacks, or credential misuse. Monitoring may be performed through integration with identity logs, access logs, and API gateways on each connected platform. Failed logins, access attempts with outdated usernames, or repeated probing behaviors are captured and analyzed in real time or near-real time.

Monitoring Access Criteria Usage Attempts 350 may continuously monitor and track attempts to use expired credentials, capturing essential details such as source IP addresses, timestamps, and user agents. The module triggers alerts to administrators upon detecting any suspicious activities, serving as a proactive defense mechanism against unauthorized access attempts and potential reconnaissance efforts by attackers.

The system keeps a detailed record of all user credentials, including their expiration status. Once credentials are deemed expired or invalidated, this status is logged in a database with metadata such as the expiration time and the associated user identity. The Monitoring and Alerting Module is specifically configured to identify any access attempts made with these expired credentials and flag them for further analysis. The monitoring module may create a historical document of access attempts by the various detected login credentials.

Upon the usage of an expired credential, the module captures and logs critical information about the event, including the source IP address, timestamp, user agent, and device information. The module employs advanced logic to detect possible reconnaissance activities by examining patterns in the usage of expired credentials, such as repeated attempts from the same IP address, login attempts across multiple accounts from a single IP, and anomalies in the timing of these attempts.

All information related to attempts using expired credentials is stored in the Database Module, including detailed logs of each attempt, assigned severity levels based on the nature of the attempt, and a comprehensive audit trail for administrators. Logs are accessible through the User Interface Module, allowing administrators to review recent activities and investigate alerts.

As a non-limiting alternative, the system may receive monitoring data from third-party SIEM tools, endpoint protection platforms, or cloud audit services. The monitoring logic may run on a dedicated engine or within a distributed observability platform. The invention also considers alternative steps which are considered a part of this disclosure that someone could use to achieve similar results. One such approach involves integrating with third-party monitoring solutions like Splunk, Datadog, or Azure Sentinel, which offer advanced anomaly detection and alerting capabilities, including machine learning-based analytics. Another approach is to enhance the system with threat intelligence platforms, allowing for the comparison of suspicious IP addresses and user agents against known malicious entities, elevating the context and urgency of alerts to administrators.

At Identifying at Threat 355, the system evaluates whether access attempts match known threat patterns or violate configured security rules. When suspicious activity is detected, it is flagged as a potential or confirmed threat. This may include detection of logins using expired credentials, repeated failed attempts, known malicious IP addresses, or unusual access times. The system cross-references these attempts with user history and policy parameters to confirm threat status.

In other embodiments, threat identification may be augmented by machine learning classifiers, threat intelligence feeds, or correlation with alerts from external detection systems.

At Automatically Triggering Automated Responses to a Detected Threat 360, the system triggers a series of predefined defensive actions aimed at containing the risk. These responses are executed without manual intervention to ensure timeliness. Actions may include disabling user accounts, blacklisting IP addresses, initiating credential re-rotation, or escalating alerts to administrative personnel. The system may also isolate the affected account from cloud services or revoke specific permissions as needed.

The process may trigger automated responses to detected threats, such as IP blocking or user account lockouts, and integrates with firewall or cloud security services for enhanced network-level defenses based on the detected reconnaissance activities.

As alternatives, threat response may be handled by external security orchestration and automation response (SOAR) tools, integrated with access gateways, or logged for delayed administrative action in lower-risk environments.

At Automatically Alerting a First and/or Second User 365, the final step involves notifying relevant parties, which may include, but is not limited to users and administrators, about the detected threat and any responsive actions taken. This ensures visibility into the event and allows for further investigation or remediation if necessary. Alerts may be delivered via email, SMS, mobile push notifications, dashboard messages, or through integration with messaging platforms like Microsoft Teams or Slack. Notifications may be tailored to different audiences, such as security teams, affected users, or executive stakeholders.

Automatically Alerting a First and/or Second User 365 may generate real-time alerts for administrators based on specific rules, which can be delivered through various channels such as SMS, email, or push notifications, and can be integrated with enterprise alerting systems for seamless workflow integration. Administrators are provided with visual tools to better understand the scope and nature of expired credential usage attempts, including map views for geolocating IP addresses, charts, and timelines to identify patterns, and user-specific timelines to track login and credential modification activities.

The step may provide a visualization that enables administrators to gain actionable insights into the history of user identity modifications, unauthorized login attempts, and any anomalies within the system, helping them to understand the context of modifications and identify trends or patterns related to identity changes and security issues. The process continuously collects data that includes but is not limited to, data related to identity modifications, such as usernames, hostnames, and FQDN changes, credential expiry, and session invalidation events, which are logged by the process along with relevant metadata, including the timestamp of the modification, old and new usernames, hostnames, and FQDN, and reasons for changes. The process may also collect data on failed login attempts, including the source IP address, user agent, time of attempt, and failure reasons.

Automatically Alerting a First and/or Second User 365 may present the collected data using a timeline view, which gives administrators a clear, chronological view of all significant events related to user identities. The timeline visually represents all changes to usernames, hostnames, and FQDN, showing the user's previous and updated usernames, hostnames, FQDN, date and time of the change, and any associated notes or reasons for the update. Administrators may view more details, such as which platform was modified and the original and current credentials.

Failed login attempts may also be plotted on the timeline, with visual markers and color coding to differentiate between severity levels. Administrators may view any failed login attempt marker to see details such as the source IP, timestamp, and failure reasons. The timeline allows administrators to use filters to focus on specific events, zoom in and out, and hover over data points to reveal tooltips with key information. The visualization may provide contextual awareness for administrators, allowing them to identify patterns of failed login attempts that might indicate brute force attacks or targeted reconnaissance, see whether changes to credentials were followed by a spike in unauthorized access attempts, and use insights from the timeline to make decisions on additional security measures or blocking IP addresses with a high number of failed attempts.

The process may export visual data to create reports for communication and auditing purposes, and share the visualization with other security analysts to help coordinate responses during an incident.

An alternative may involve integrating the system with third-party visualization tools like Grafana, Power BI, Splunk, or Kibana, which provide pre-built widgets, advanced customization, and easy integration with logs for real-time monitoring and complex queries. Another approach is to present the history in a tabular format with sortable columns and filters, which may be easier to implement but less effective in showing trends or correlations. Lastly, the system could use heatmaps to visualize failed login attempts over different time periods or geographic regions, allowing administrators to quickly see periods or areas of high activity.

As a non-limiting alternative, alerts may be logged to centralized monitoring systems, reported through ticketing tools, or integrated with incident response workflows managed by external cybersecurity operations centers.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments). Any of the above mentioned systems, units, modules, engines, controllers, components, process steps or the like may be and/or comprise hardware and/or software as described herein. For example, the systems, engines, and subcomponents described herein may be and/or comprise computing hardware and/or software as described herein in association with FIGS. 4-7. Furthermore, any of the above mentioned systems, units, modules, engines, controllers, components, interfaces or the like may use and/or comprise an application programming interface (API) for communicating with other systems units, modules, engines, controllers, components, interfaces or the like for obtaining and/or providing data or information.

Figure 4:
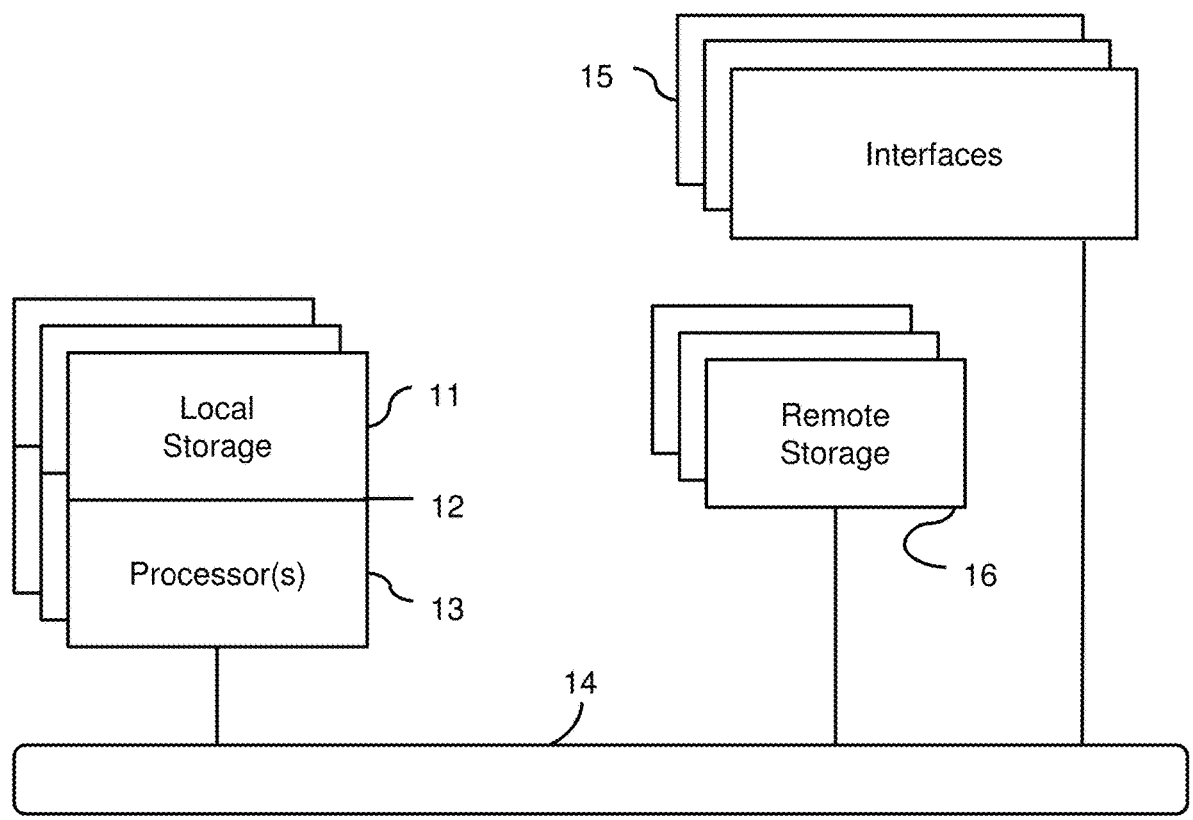
FIG. 4 illustrates one embodiment of the computing architecture that supports an embodiment of the inventive disclosure.

Referring now to FIG. 4, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random-access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 4 illustrates one specific architecture for a computing device 10 for implementing one or more of the embodiments described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, single processor 13 handles communications as well as routing computations, while in other embodiments a separate dedicated communications processor may be provided. In various embodiments, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 5:
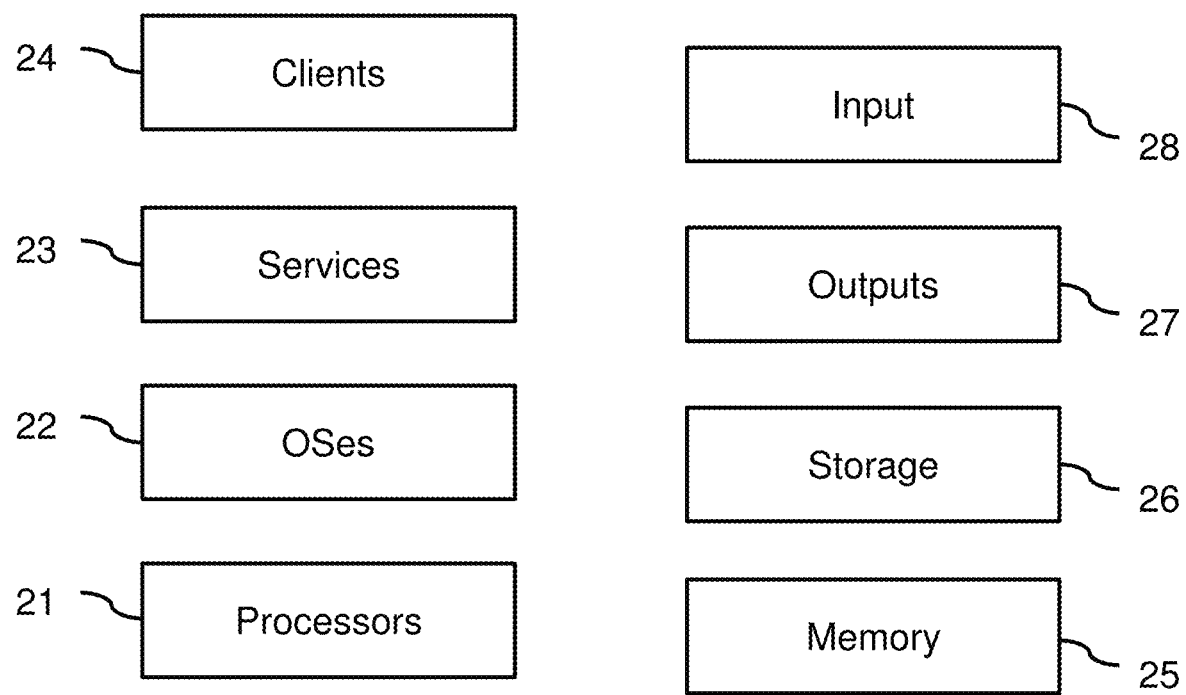
FIG. 5 illustrates components of a system architecture that supports an embodiment of the inventive disclosure.

In some embodiments, systems may be implemented on a standalone computing system. Referring now to FIG. 5, there is shown a block diagram depicting a typical exemplary architecture of one or more embodiments or components thereof on a standalone computing system. Computing device 20 includes processors 21 that may run software that carry out one or more functions or applications of embodiments, such as for example a client application. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 4). Examples of storage devices 26 include flash memory, magnetic hard drive, CD-ROM, and/or the like.

Figure 6:
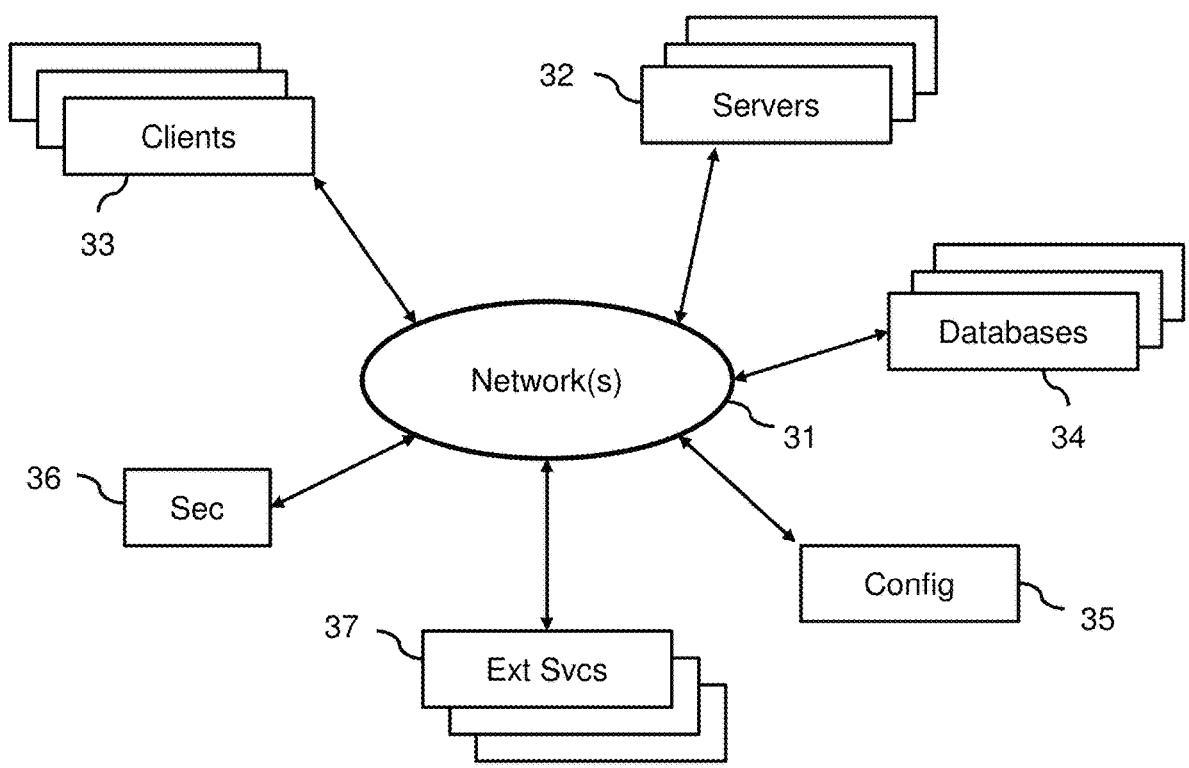
FIG. 6 illustrates components of a computing device that supports an embodiment of the inventive disclosure.

In some embodiments, systems may be implemented on a distributed computing network, such as one having any number of clients and/or servers. Referring now to FIG. 6, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 5. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in one aspect where client applications are implemented on a smartphone or other electronic device, client applications may obtain information stored in a server system 32 in the cloud or on an external service 37 deployed on one or more of a particular enterprise's or user's premises.

In some embodiments, clients 33 or servers 32 (or both) may make use of one or more specialized services or appliances that may be deployed locally or remotely across one or more networks 31. For example, one or more databases 34 may be used or referred to by one or more embodiments. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some embodiments, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some embodiments may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments without limitation, unless a specific security 36 or configuration system 35 or approach is specifically required by the description of any specific aspect.

Figure 7:
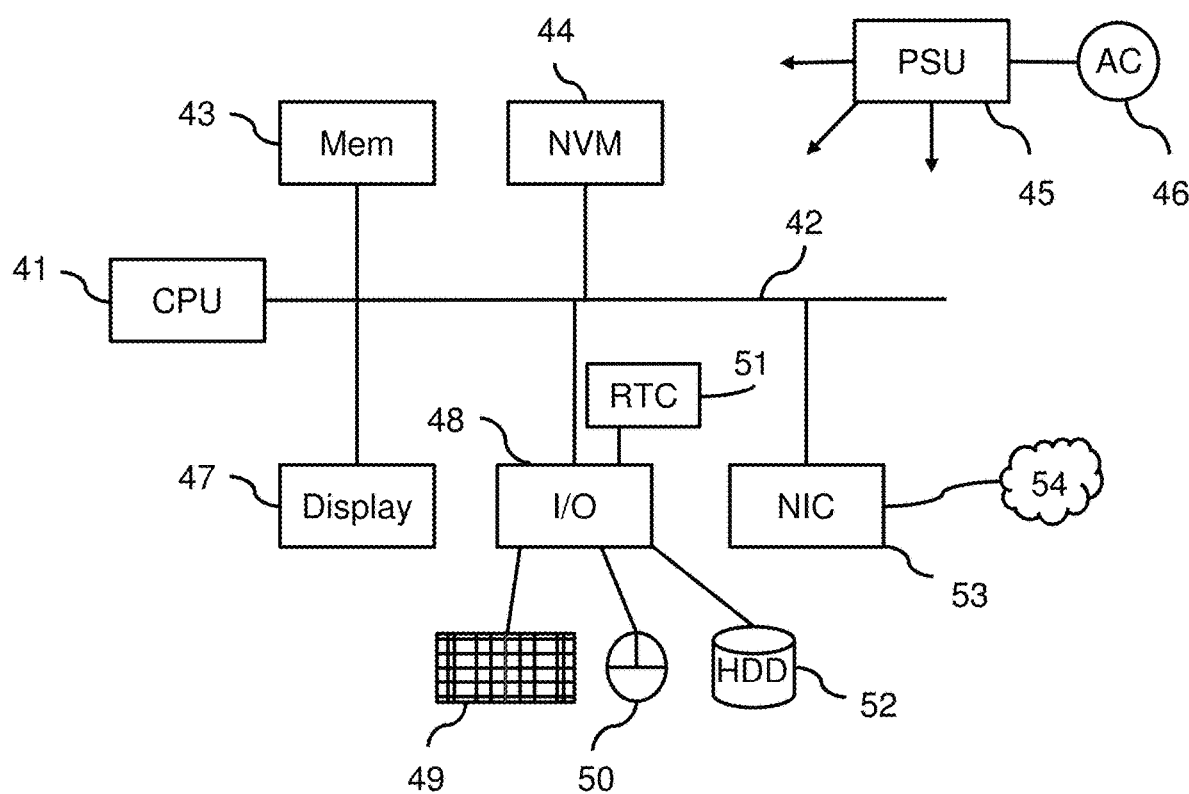
FIG. 7 illustrates components of a computing device that supports an embodiment of the inventive disclosure.

FIG. 7 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of various embodiments may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various embodiments described above. Accordingly, the present invention is defined by the claims and their equivalents.

ADDITIONAL CONSIDERATIONS

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and/or a process associated with the disclosed principles herein. Thus, while particular embodiments and applications have been illustrated and described, it is to be understood that the disclosed embodiments are not limited to the precise construction and components disclosed herein. Various apparent modifications, changes and variations may be made in the arrangement, operation and details of the method and apparatus disclosed herein without departing from the spirit and scope defined in the appended claims.

What is claimed is:

1. A computer implemented method for improving network security by dynamically adjusting access to digital resources, the computer implemented method comprising:
   obtaining a request from a first user device, the request comprising a request to dynamically adjust access criteria associated with a second user a fully qualified domain name and/or a host name, the request specifying an address identifier associated with the second user, fully qualified domain name and/or host name and a first access criteria, wherein the dynamically adjusted access criteria comprises a username, fully qualified domain name, and/or host name;
   storing the address identifier within a table in a database, wherein the table associated with the address identifier comprises user contact data and at least one former access criteria associated with the address identifier, wherein the former access criteria is expired;
   receiving a set of dynamic modification rules, the dynamic modification rules based on the obtained request, the dynamic modification rules indicating the frequency at which access criteria are to be dynamically adjusted;
   defining an access criteria modification schedule by applying the set of dynamic modification rules, wherein the access modification schedule comprises at least one modification timestamp indicating when access criteria are to be modified;
   generating a first access token via at least one platform-based authentication and the first access criteria;

automatically generate a second access criteria at a time associated with a modification timestamp, wherein the second access criteria is different than former access criteria associated with the second user, wherein the second access criteria is generated using a random access criteria generation protocol, wherein the random access criteria generation protocol comprises confirming the second access criteria does not match a former access criteria stored in the database;

updating access to at least one platform by providing the second access criteria to at least one platform via an Application Programming Interface;

storing the second access criteria in the table in the database, and associating the second access criteria with the second user in the database;

invalidating the first access token and establishing the first access criteria as expired;

providing the second user with the second access criteria through the stored contact data;

monitoring access criteria usage attempts by observing usage of the access criteria associated with at least one platform, wherein monitoring gathers metadata associated with the usage of the access criteria;

identifying a threat by comparing access criteria usage attempts to the table of expired access criteria;

automatically triggering automated responses to a detected threat, wherein the automated responses comprise IP blocking and/or user account lockouts in real time; and automatically alerting the first and/or second user with the metadata and access criteria and activities taken associated with the identified threat.

2. The computer implemented method according to claim 1, wherein the set of dynamic modification rules further comprises a schedule provided by a user or applying default settings.

3. The computer implemented method according to claim 1, wherein platform based authentication comprises authentication libraries, service accounts with predefined permissions, command line authentication tools, and/or certificate-based authentication.

4. The computer implemented method according to claim 1, further comprising updating, in the table, a status indicator associated with the second access criteria to indicate the second access criteria is valid.

5. The computer implemented method according to claim 1, wherein the stored contact data enables distribution of the second access criteria through SMS, email, physical transmission, and/or app notifications.

6. The computer implemented method according to claim 1, wherein the random access criteria generation protocol comprises a set of rules obtained from at least one platform.

7. The computer implemented method according to claim 1, wherein the address identifier has a set of permissions associated with the second user, further comprising generating a copy of the permissions associated with the second user and associating the copy with a third user, removing the permissions from the second user, and monitoring the access attempts associated with the second user.

8. The computer implemented method according to claim 1, wherein the metadata comprises an IP address, user agents, and/or timestamps.

9. The computer implemented method according to claim 1, further comprising generating an access attempt history and actions taken from the monitored access criteria usage attempts;

updating the table in the database with the access attempt history and actions taken; and displaying an access attempt history on a user device.

10. The computer implemented method according to claim 1, wherein modifying the first access criteria occurs immediately after automatically generating a second access criteria.

11. The computer implemented method according to claim 1, wherein the user identifier comprises an email address associated with the second user.

12. The computer implemented method according to claim 1, wherein invalidating the first access token comprises embedding expiration or invalidation flags within the first access token.

13. The computer implemented method according to claim 1, wherein the modification rules and/or timestamps are generated using a randomization function.

14. The computer implemented method according to claim 1, wherein updating access to at least one platform comprises modifying the user principal name.

15. The computer implemented method according to claim 1, wherein updating access to at least one platform does not modify the user email.

16. The computer implemented method according to claim 1, wherein invalidating comprises finding sessions associated with the first criteria and terminating the sessions and invalidating all access tokens associated with the sessions.

17. The computer implemented method according to claim 1, further comprising detecting when the first access criteria is used and wherein the invalidating is performed after a predefined interval after detection of the use of the first access criteria.

18. A computing system for improving network security by dynamically adjusting access to digital resources, the computing system comprising: a database; at least one computing processor; and memory comprising instructions that, when executed by the at least one computing processor, enable the computing system to: obtaining a request from a first user device, the request comprising a request to dynamically adjust access criteria associated with a second user a fully qualified domain name and/or a host name, the request specifying an address identifier associated with the second user, fully qualified domain name and/or host name and a first access criteria, wherein the dynamically adjusted access criteria comprises a username, fully qualified domain name, and/or host name; storing the address identifier within a table in a database, wherein the table associated with the address identifier comprises user contact data and at least one former access criteria associated with the address identifier, wherein the former access criteria is expired; receiving a set of dynamic modification rules, the dynamic modification rules based on the obtained request, the dynamic modification rules indicating the frequency at which access criteria are to be dynamically adjusted; defining an access criteria modification schedule by applying the set of dynamic modification rules, wherein the access modification schedule comprises at least one modification timestamp indicating when access criteria are to be modified; generating a first access token via at least one platform based authentication and the first access criteria; automatically generate a second access criteria at a time associated with a modification timestamp, wherein the second access criteria is different than former access criteria associated with the second user, wherein the second access criteria is generated using a random access criteria generation protocol, wherein the random access criteria generation protocol comprises confirming the second access criteria does not match a former access criteria stored in the database; updating access to at least one platform by providing the second access criteria to at least one platform via an Application Programming Interface; storing the second access criteria in the table in the database, and associating the second access criteria with the second user in the database; invalidating the first access token and establishing the first access criteria as expired; providing the second user with the second access criteria through the stored contact data; monitoring access criteria usage attempts by observing usage of the access criteria associated with at least one platform, wherein monitoring gathers metadata associated with the usage of the access criteria; identifying a threat by comparing access criteria usage attempts to the table of expired access criteria; automatically triggering automated responses to a detected threat, wherein the automated responses comprise IP blocking and/or user account lockouts in real time; and automatically alerting a first and/or second user with the metadata and access criteria and activities taken associated with the identified threat.

19. A non-transitory computer readable medium comprising instructions that when executed by a processor enable the processor to: obtaining a request from a first user device, the request comprising a request to dynamically adjust access criteria associated with a second user a fully qualified domain name and/or a host name, the request specifying an address identifier associated with the second user, fully qualified domain name and/or host name and a first access criteria, wherein the dynamically adjusted access criteria comprises a username, fully qualified domain name, and/or host name; storing the address identifier within a table in a database, wherein the table associated with the address identifier comprises user contact data and at least one former access criteria associated with the address identifier, wherein the former access criteria is expired; receiving a set of dynamic modification rules, the dynamic modification rules based on the obtained request, the dynamic modification rules indicating the frequency at which access criteria are to be dynamically adjusted; defining an access criteria modification schedule by applying the set of dynamic modification rules, wherein the access modification schedule comprises at least one modification timestamp indicating when access criteria are to be modified; generating a first access token via at least one platform based authentication and the first access criteria; automatically generate a second access criteria at a time associated with a modification timestamp, wherein the second access criteria is different than former access criteria associated with the second user, wherein the second access criteria is generated using a random access criteria generation protocol, wherein the random access criteria generation protocol comprises confirming the second access criteria does not match a former access criteria stored in the database; updating access to at least one platform by providing the second access criteria to at least one platform via an Application Programming Interface; storing the second access criteria in the table in the database, and associating the second access criteria with the second user in the database; invalidating the first access token and establishing the first access criteria as expired; providing the second user with the second access criteria through the stored contact data; monitoring access criteria usage attempts by observing usage of the access criteria associated with at least one platform, wherein monitoring gathers metadata associated with the usage of the access criteria; identifying a threat by comparing access criteria usage attempts to the table of expired access criteria; automatically triggering automated responses to a detected threat, wherein the automated responses comprise IP blocking and/or user account lockouts in real time; and automatically alerting a first and/or second user with the metadata and access criteria and activities taken associated with the identified threat.

* * * * *